(12) United States Patent
Chang et al.

(10) Patent No.: US 9,065,652 B2
(45) Date of Patent: Jun. 23, 2015

(54) APPARATUS AND METHOD FOR GENERATING MAC PROTOCOL DATA UNIT IN WIRELESS COMMUNICATION SYSTEM

(71) Applicant: Samsung Electronics Co. Ltd., Suwon-si, Gyeonggi-do (KR)

(72) Inventors: Young-Bin Chang, Anyang-si (KR); Agiwal Anil, Karnataka (IN); Jung-Je Son, Yongin-si (KR); Young-Kyo Baek, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 50 days.

(21) Appl. No.: 13/665,590

(22) Filed: Oct. 31, 2012

(65) Prior Publication Data

US 2013/0051350 A1 Feb. 28, 2013

Related U.S. Application Data

(63) Continuation of application No. 12/553,436, filed on Sep. 3, 2009, now Pat. No. 8,311,029.

(30) Foreign Application Priority Data

| Sep. 3, 2008 | (KR) | 10-2008-0087011 |
| Sep. 5, 2008 | (KR) | 10-2008-0087747 |
| Jan. 6, 2009 | (KR) | 10-2009-0000958 |
| Mar. 2, 2009 | (KR) | 10-2009-0017720 |
| Apr. 21, 2009 | (KR) | 10-2009-0034721 |

(51) Int. Cl.
*H04W 4/00* (2009.01)
*H04L 1/18* (2006.01)
(Continued)

(52) U.S. Cl.
CPC ....... *H04L 1/1896* (2013.01); *H04L 2212/0025* (2013.01); *H04W 80/12* (2013.01); *H04W 80/04* (2013.01); *H04W 28/04* (2013.01); *H04W 28/065* (2013.01); *H04W 80/02* (2013.01)

(58) Field of Classification Search
None
See application file for complete search history.

(56) References Cited

U.S. PATENT DOCUMENTS 8,175,015 B1 * 5/2012 Chowdhuri et al. .......... 370/300
8,311,029 B2 11/2012 Chang et al.
(Continued)

FOREIGN PATENT DOCUMENTS

| CN | 1960561 A | 5/2007 |
| EP | 1 675 323 A1 | 6/2006 |

(Continued)

OTHER PUBLICATIONS

Sungcheol Chang and Chulsik Yoon ETRI, Subheader and Security Extended Headers, IEEE C802.16m-09/0486, Mar. 9, 2008, pp. 1-7.
(Continued)

*Primary Examiner* — Bob Phunkulh
(74) *Attorney, Agent, or Firm* — Jefferson IP Law, LLP

(57) ABSTRACT

An apparatus and method for generating a Media Access Control (MAC) Protocol Data Unit (MPDU) in a wireless communication system are provided. The method includes reconstructing at least one MAC Service Data Unit (MSDU) according to scheduling information of the MAC layer and generating at least one MAC Protocol Data Unit (MPDU) data portion, adding control information to each MPDU data portion and generating at least one MPDU payload, the control information comprising MSDU information constituting each MPDU data portion, adding a General MAC Header (GMH) to each MPDU payload and generating at least one MPDU, the GMH including length information on the MPDU and Connection IDentifier (CID) information, and transmitting the MPDU to a receive end.

12 Claims, 14 Drawing Sheets

(51) Int. Cl.
*H04W 80/12* (2009.01)
*H04W 80/04* (2009.01)
*H04W 28/04* (2009.01)
*H04W 28/06* (2009.01)
*H04W 80/02* (2009.01)

(56) References Cited

U.S. PATENT DOCUMENTS

| | | |
|---|---|---|
| 2005/0195822 A1 | 9/2005 | Lim et al. |
| 2005/0265390 A1* | 12/2005 | Lee et al. .................. 370/469 |
| 2006/0133424 A1* | 6/2006 | Han et al. .................. 370/474 |
| 2007/0206508 A1 | 9/2007 | Sammour et al. |
| 2008/0049654 A1 | 2/2008 | Otal et al. |
| 2008/0107061 A1* | 5/2008 | Tao et al. .................. 370/315 |
| 2009/0074088 A1* | 3/2009 | Tao et al. .................. 375/260 |
| 2009/0086659 A1* | 4/2009 | Pani et al. .................. 370/310 |
| 2009/0116436 A1* | 5/2009 | Okuda .................. 370/329 |
| 2009/0168770 A1 | 7/2009 | Mohanty |
| 2009/0213778 A1 | 8/2009 | Tao et al. |
| 2009/0245166 A1* | 10/2009 | Okuda .................. 370/315 |
| 2009/0310533 A1 | 12/2009 | Zheng et al. |
| 2009/0316806 A1* | 12/2009 | Cheng et al. .................. 375/260 |

FOREIGN PATENT DOCUMENTS

| | | |
|---|---|---|
| JP | 2007-515113 A | 6/2007 |
| KR | 10-2005-0053086 A | 6/2005 |
| KR | 10-2006-0074795 A | 7/2006 |
| KR | 10-2007-0003274 A | 1/2007 |
| RU | 2003134279 A | 5/2005 |
| WO | 20061071052 A1 | 7/2006 |
| WO | 2007/039023 A1 | 4/2007 |
| WO | 2007/053950 A1 | 5/2007 |
| WO | 2007/078156 A2 | 7/2007 |
| WO | 2007/143472 A2 | 12/2007 |
| WO | 2008/078365 A1 | 7/2008 |
| WO | 2008/084426 A1 | 7/2008 |
| WO | 2009/091011 A1 | 7/2009 |

OTHER PUBLICATIONS

International Preliminary Report on Patentability issued date Mar. 8, 2011 in connection to PCT/KR2009/004981 International Application filed Sep. 3, 2009.

Written Opinion of the International Authority mailing date Apr. 27, 2010 in connection to PCT/KR2009/004981 International Application filed Sep. 3, 2009.

Agiwal et al., SDU Fragmentation and Packing Scheme for 16m, Institute of Electrical and Electronics Engineers (IEEE) 802.16 Presentation Submission Template (Rev. 9), Sep. 5, 2008, pp. 1-10, IEEE C802.16m-08/1175, XP017725069, IEEE-SA, Piscataway, New Jersey, U.S.

Chatterjee et al., Feedback-Based Real-Time Streaming Over WiMAX, IEEE Wireless Communications, Feb., 2007, pp. 64-71, vol. 14, No. 1, XP011184093, IEEE Service Center, Piscataway, New Jersey, U.S.

Tao et al., Performance Improvement for Multichannel HARQ Protocol in Next Generation WiMAX System, Wireless Communications and Networking Conference, Mar. 31, 2008, pp. 2009-2014, WCNC 2008, XP031243942, IEEE, Piscataway, New Jersey, U.S.

* cited by examiner

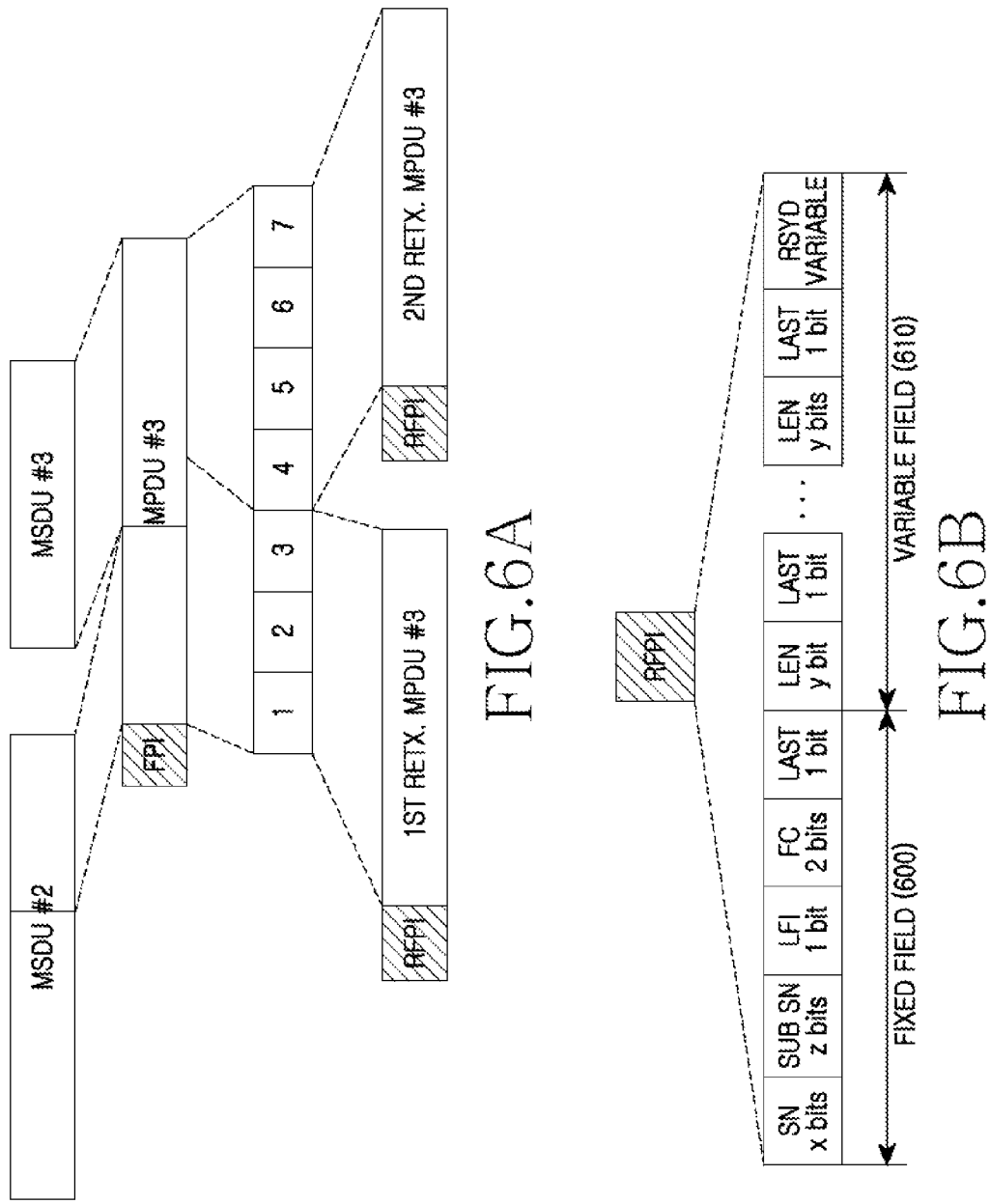

APPARATUS AND METHOD FOR GENERATING MAC PROTOCOL DATA UNIT IN WIRELESS COMMUNICATION SYSTEM

PRIORITY

This application is continuation of U.S. application Ser. No. 12/553,436 filed Sep. 3, 2009 which claims the benefit under 35 U.S.C. §119(a) of a Korean patent application filed in the Korean Intellectual Property Office on Sep. 3, 2008 and assigned Serial No. 10-2008-0087011, a Korean patent Application filed in the Korean Intellectual Property Office on Sep. 5, 2008 and assigned Serial No. 10-2008-0087747, a Korean patent application filed in the Korean Intellectual Property Office on Jan. 6, 2009 and assigned Serial No. 10-2009-0000958, a Korean patent application filed in the Korean Intellectual Property Office on Mar. 2, 2009 and assigned Serial No. 10-2009-0017720, and a Korean patent application filed in the Korean Intellectual Property Office on Apr. 21, 2009 and assigned Serial No. 10-2009-0034721, the entire disclosures of all of which are hereby incorporated by reference.

BACKGROUND OF THE INVENTION

1. Field of the Invention

The present invention relates to an apparatus and method for generating a Media Access Control (MAC) Protocol Data Unit (MPDU) in a wireless communication system. More particularly, the present invention relates to an apparatus and method for generating a header or sub-header that represents MAC Service Data Unit (MSDU) information constituting an MPDU in a wireless communication system.

2. Description of the Related Art

In a wireless communication system, a MAC layer of a transmit end processes MSDUs received from an upper layer and generates an MPDU for transmission to a lower layer. For example, in the Institute of Electrical and Electronics Engineers (IEEE) 802.16 standard, the transmit end generates an MPDU as illustrated in FIGS. 1A through 1D. 1.

FIGS. 1A through 1D 1 illustrate a construction of an MPDU in a wireless communication system according to the conventional art.

As illustrated in FIG. 1A, a MAC layer of a transmit end receives three MSDUs from an upper layer. After that, as illustrated in FIG. 1B, the transmit end fragments the MSDUs into Automatic Repeat reQuest (ARQ) blocks of a fixed length. At this time, the length of the ARQ block fragmenting the MSDU in the transmit end is commonly applied to all receive ends.

After that, as illustrated in FIG. 1C the transmit end constructs an MPDU with the fragmented ARQ blocks. For example, the transmit end constructs a first MPDU with an ARQ block #1 to an ARQ block #3, constructs a second MPDU with an ARQ block #4 to an ARQ block #9, and constructs a third MPDU with an ARQ block #10 to an ARQ block #13.

If constructing the MPDUs as illustrated in FIG. 1C, one MPDU includes parts from one or more MSDUs. For example, the second MPDU includes a part of an MSDU #1, a part of an MSDU #2, and a part of an MSDU #3.

Thus, the transmit end adds a Fragmentation Sub-Header (FSH) or Packing Sub-Header (PSH), which includes MSDU information constituting each MPDU, to each MPDU so that the receive end can reconstruct an MSDU using the MPDUs. At this time, the transmit end adds the FSH to an MPDU composed of one MSDU or a part of the MSDU, and adds the PSH to an MPDU composed of two or more MSDUs or two or more fragmented MSDUs. For example, the first MPDU of FIG. 1C consists of a part of the MSDU #1 and thus includes an FSH. The third MPDU consists of a part of the MSDU #3 and thus includes an FSH. The second MPDU of FIG. 1C consists of a part of the MSDU #1, the MSDU #2, and a part of the MSDU #3 and thus includes a PSH before each MSDU. Here, the FSH or PSH added to each MPDU includes the lowest ARQ Sequence Number (SN) among SNs of ARQ blocks constituting the MPDU.

If generating the MPDUs as in FIG. 1C, the transmit end constructs a PHYsical (PHY) Protocol Data Unit (PPDU) with the MPDUs as illustrated in FIG. 1D. For example, the transmit end constructs a first PPDU with the first MPDU and the second MPDU, and constructs a second PPDU with the third MPDU.

The receive end can identify MSDU information included in each MPDU using an FSH and PSH included in each MPDU, and reconstruct an MSDU. Also, if having knowledge of a length of the MPDU and a fixed length of an ARQ block, the receive end can be aware of the number of ARQ blocks included in each MPDU.

As described above, the transmit end constructs an MPDU with ARQ blocks of a fixed length fragmenting an MSDU. Thus, when a size of a physical layer resource allocated for data transmission is not a multiple of an ARQ block size, there is a problem that the transmit end fails to add an MPDU in a PPDU, thus wasting a resource.

A data throughput at a receive end is proportional to a size of an ARQ block. Thus, the receive end has to set the ARQ block large in size to increase the data throughput. However, in order to commonly apply a length of the ARQ block to all receive ends, the transmit end sets the ARQ block small in length so that it can provide service to a receive end having the worst channel condition. That is, if transmitting data to a receive end with a poor channel condition, the transmit end increases a transmission power and thus, cannot transmit a large amount of data at a time in a physical layer. Therefore, the transmit end sets an ARQ block size of a MAC layer small. Thus, there is a problem that a data throughput of the whole system is deteriorated.

SUMMARY OF THE INVENTION

An aspect of the present invention is to address at least the above-mentioned problems and/or disadvantages and to provide at least the advantages described below. Accordingly, an aspect of the present invention is to provide an apparatus and method for generating a Media Access Control (MAC) Protocol Data Unit (MPDU) in a wireless communication system.

Another aspect of the present invention is to provide an apparatus and method for, without fragmenting a MAC Service Data Unit (MSDU) into ARQ blocks of a fixed length, reconstructing the MSDUs and generating an MPDU in a wireless communication system.

A further aspect of the present invention is to provide an apparatus and method for generating a header or sub-header including MSDU information constituting an MPDU in a wireless communication system.

Yet another aspect of the present invention is to provide an apparatus and method for generating a retransmission MPDU in a wireless communication system.

Still another aspect of the present invention is to provide an apparatus and method for fragmenting an MPDU into ARQ sub blocks and generating a retransmission MPDU in a wireless communication system.

Yet another aspect of the present invention is to provide an apparatus and method for generating a header or sub-header including MSDU information constituting a retransmission MPDU in a wireless communication system.

Still another aspect of the present invention is to provide an apparatus and method for generating a header or sub-header including MSDU information constituting a retransmission multiplex MPDU in a wireless communication system.

The above aspects are addressed by providing an apparatus and method for generating data for error control in a wireless communication system.

According to an aspect of the present invention, a method for generating data of a Media Access Control (MAC) layer in a wireless communication system is provided. The method includes reconstructing at least one MAC Service Data Unit (MSDU) according to scheduling information of the MAC layer and generating at least one MAC Protocol Data Unit (MPDU) data portion, adding control information to each MPDU data portion and generating at least one MPDU payload, the control information comprising MSDU information constituting each MPDU data portion, adding a General MAC Header (GMH) to each MPDU payload and generating at least one MPDU, the GMH including length information on the MPDU and Connection IDentifier (CID) information, and transmitting the MPDU to a receive end.

According to another aspect of the present invention, an apparatus for generating data of a MAC layer in a wireless communication system is provided. The apparatus includes a data constructor for reconstructing at least one MAC Service Data Unit (MSDU) according to scheduling information of the MAC layer and for generating at least one MAC Protocol Data Unit (MPDU) data portion, a control message generator for generating control information and a General MAC Header (GMH), the control information including MSDU information constituting each MPDU data portion, and the GMH including length information on an MPDU and Connection IDentifier (CID) information, a controller for adding the control information and the GMH to the MPDU data portion and for generating the MPDU, and a transmitter for transmitting the MPDU to a receive end.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 6A and 6B are diagrams illustrating a construction of an FPI for a retransmission MPDU in a wireless communication system according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A technology for generating a Media Access Control (MAC) Protocol Data Unit (MPDU) in a wireless communication system according to an exemplary embodiment of the present invention is described below.

In the following description, a transmit end and a receive end include all transmit/receive nodes constituting a wireless communication system such as an Access Service Network GateWay (ASN-GW), a Base Station (BS), a Mobile Station (MS), a Relay Station (RS), etc.

Figure 1:
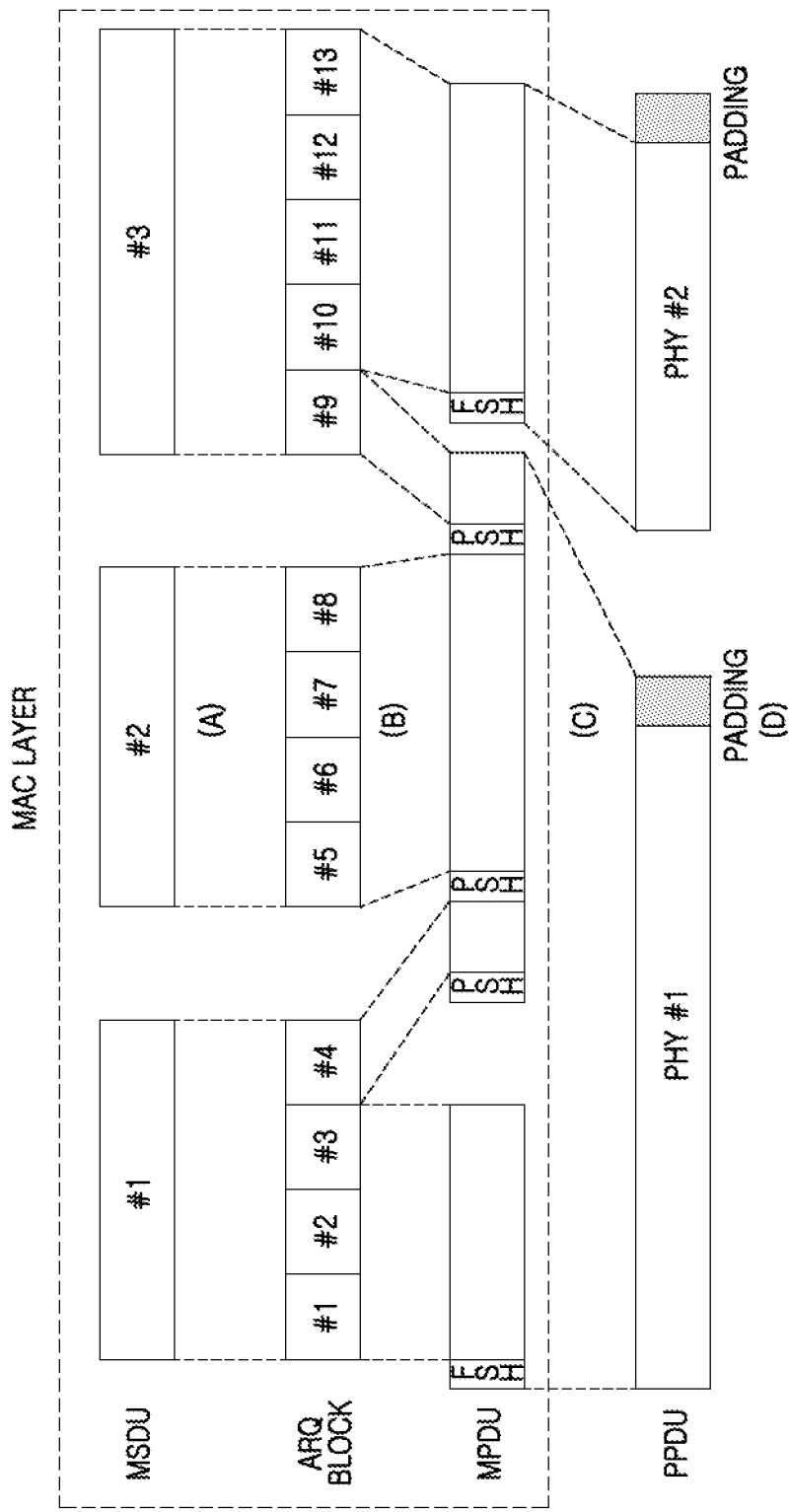
FIGS. 1A through 1D illustrate a construction of an Media Access Control (MAC) Protocol Data Unit (MPDU) in a wireless communication system according to the conventional art.
Figure 2:
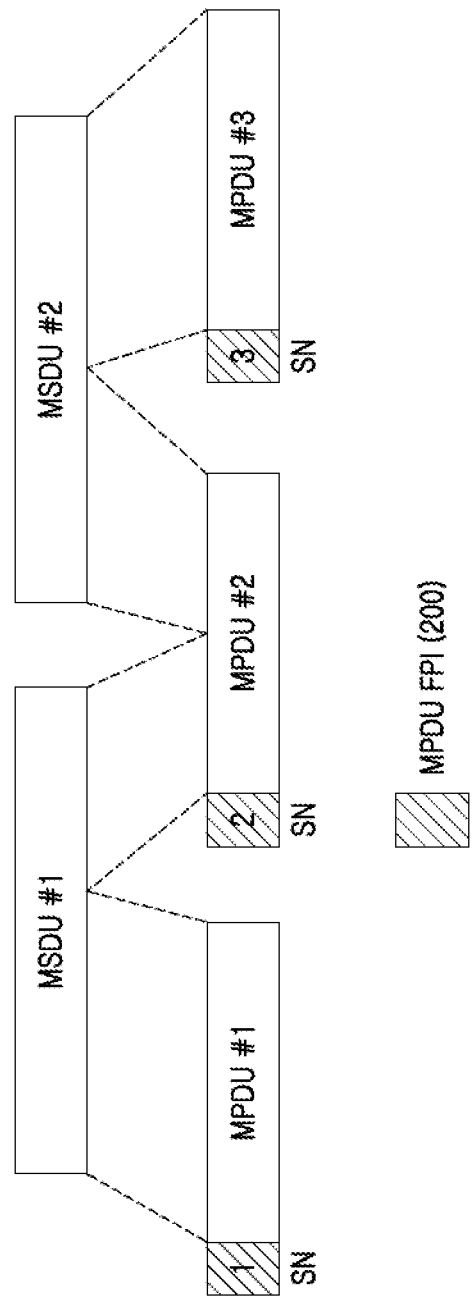
FIG. 2 illustrates a construction of an MPDU in a wireless communication system according to an exemplary embodiment of the present invention.

The transmit end of the wireless communication system constructs an MPDU as illustrated in FIG. 2.

FIG. 2 illustrates a construction of an MPDU in a wireless communication system according to an exemplary embodiment of the present invention.

As illustrated in FIG. 2, if a MAC layer of a transmit end receives two MAC Service Data Units (MSDUs) from one connection of an upper layer, the transmit end reconstructs the MSDUs according to resource scheduling information of the MAC layer and generates MPDU data portions. For example, the transmit end reconstructs an MSDU #1 and an MSDU #2 according to the resource scheduling information of the MAC layer and generates three MPDU data portions. At this time, the transmit end sequentially allocates a Sequence Number (SN) to each MPDU data portion.

The transmit end generates a Fragmentation and Packing Indicator (FPI) 200 including an SN allocated to an MPDU, and adds the FPI 200 to each MPDU data portion, thus generating an MPDU payload. Here, the transmit end generates the FPI in a form of a MAC header or MAC sub-header of the MPDU and adds the FPI to the MPDU data portion.

For example, the MPDU includes an MPDU data portion, an FPI, and a General MAC Header (GMH). Accordingly, although not illustrated, the transmit end adds the GMH to the MPDU payload, and generates the MPDU.

If taking an Automatic Repeat reQuest (ARQ) technique into consideration, the transmit end sets one MPDU data portion as one ARQ block. Thus, the transmit end can use the SN allocated to each MPDU as an ARQ sequence number.

On the other hand, if not applying the ARQ to the MPDU, the transmit end uses the SN allocated to each MPDU as an SN for distinguishing MPDUs.

As described above, if reconstructing an MSDU according to resource scheduling information of a MAC layer and generating an MPDU, the transmit end can construct the MPDU considering an available resource of a physical layer. Also, the transmit end performs ARQ by MPDU and thus may variably control a length of the MPDU considering a channel condition with a receive end.

If the transmit end reconstructs an MSDU and generates an MPDU, one MPDU can include one or more pieces of MSDU information. Thus, the transmit end constructs an FPI including MSDU information constituting each MPDU data portion and adds the FPI to each MPDU so that the receive end can reconstruct the MSDU through MPDUs. At this time, the FPI is constructed to include the MSDU information constituting the MPDU as illustrated in FIGS. 3A and 3B.

Figure 3:
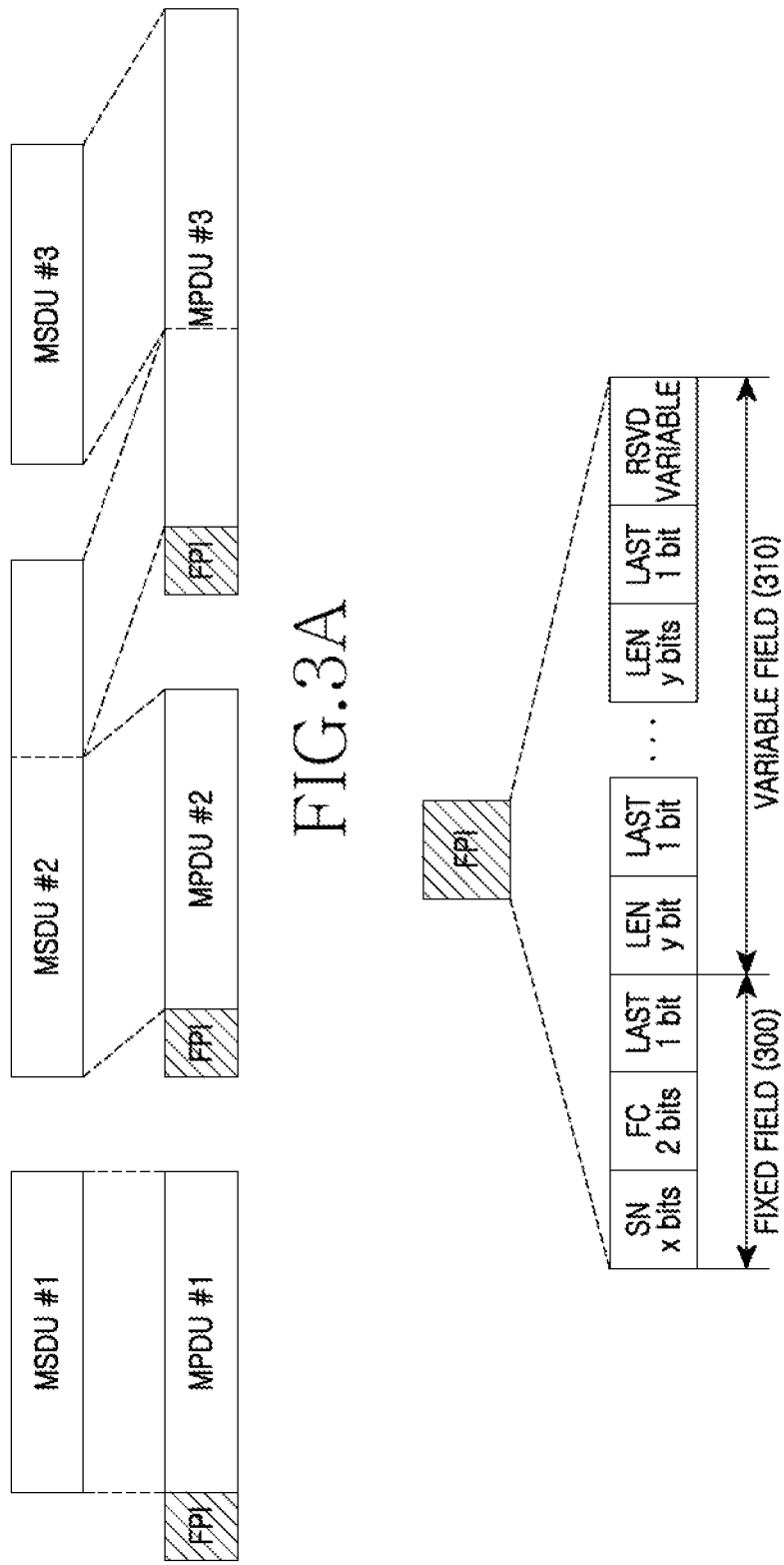
FIGS. 3A and 3B illustrate a construction of a Fragmentation and Packing Indicator (FPI) for an MPDU in a wireless communication system according to an exemplary embodiment of the present invention.

FIGS. 3A and 3B illustrate a construction of an FPI for an MPDU in a wireless communication system according to an exemplary embodiment of the present invention.

FIG. 3A illustrates a construction of the MPDU, and FIG. 3B illustrates a construction of the FPI.

Referring to FIG. 3A, if a MAC layer of a transmit end receives three MSDUs from one connection of an upper layer, the transmit end reconstructs the three MSDUs according to resource scheduling information of the MAC layer and generates MPDUs. For example, the transmit end generates an MPDU #1 data portion including an MSDU #1, and generates an MPDU #2 data portion including a part of an MSDU #2. Also, the transmit end generates an MPDU #3 data portion including a part of the MSDU #2 and an MSDU #3.

Referring to FIG. 3B, the transmit end constructs the FPI including MSDU information constituting each MPDU data portion and adds the FPI to each MPDU data portion.

As illustrated in FIG. 3B, the FPI includes fixed field 300 information commonly included, and variable field 310 information included only at the time of packing MSDUs.

The fixed field 300 includes an SN field including sequence information on an MPDU not applying ARQ block or ARQ, a Fragmentation Control (FC) field representing fragmentation and packing information on an MSDU constituting the MPDU, and a LAST field representing the existence or non-existence of the variable field 310.

The variable field 310 includes a LENgth (LEN) field representing length information on an MSDU constituting an MPDU, and a LAST field representing the existence or non-existence of an additional variable field 310. That is, the variable field 310 is comprised of a successive combination of the LEN field and the LAST field depending on the number of the MSDUs constituting the MPDU. Here, the LEN field includes information on a length of one MSDU or a length of a fragmented MSDU.

For example, the transmit end can construct the FPI as illustrated in Table 1 below.

TABLE 1

| Syntax | Size (bit) | Notes |
|---|---|---|
| FPI{ | | |
|   if(ARQ Enabled Connection){ | | |
|     SN | xx | Sequence number of the current ARQ block in MPDU |
|   } | | |
|   else{ | | |
|     SN | yy | Sequence number of the current non-ARQ block in MPDU |
|   } | | |
|   FC | 2 | See table 2 for details of this field |
|   LAST | 1 | 0 = More Packing Info in the list<br>1 = No Packing Info in the list |
|   While(!LAST){ | | |
|     LAST | 1 | |
|     LENGTH | zz | Length of SDU or SDU fragment packed in MPDU payload in bytes |
|   } | | |
|   Reserved | | Byte alignment |
| } | | |

Here, the FPI includes an SN field including sequence information on an MPDU not applying ARQ block or ARQ, an FC field representing fragmentation or packing information on an MSDU constituting the MPDU, a LAST field representing the existence or non-existence of a variable field, a LEN field representing length information on the MSDU constituting the MPDU if the variable field exists, and a LAST field representing the existence or non-existence of an additional variable field. Here, the MPDU can have a sequence number of a different length depending on ARQ application or non-application. Also, the variable field is comprised of a successive combination of the LEN field and the LAST field depending on the number of the MSDUs constituting the MPDU. Also, the LEN field includes information on a length of one MSDU or a length of a fragmented MSDU.

The transmit end sets the FC of Table 1 using detailed FC information illustrated in Table 2 below.

TABLE 2

| Field | Description |
|---|---|
| FC = 00 | Start byte information on MSDU included in MPDU is the same as start byte information on original SDU, and last byte information on MSDU included in MPDU is the same as last byte information on original SDU |
| FC = 01 | Start byte information on MSDU included in MPDU is the same as start byte information on original SDU, and last byte information on MSDU included in MPDU is not the same as last byte information on original SDU |
| FC = 10 | Start byte information on MSDU included in MPDU is not the same as start byte information on original SDU, and last byte information on MSDU included in MPDU is the same as last byte information on original SDU |
| FC = 11 | Start byte information on MSDU included in MPDU is not the same as start byte information on original SDU, and last byte information on MSDU included in MPDU is not the same as last byte information on original SDU |

Here, the FC represents fragmentation or packing information on an MSDU included in an MPDU.

For example, a case of constructing FPIs of MPDUs of FIG. 3A using Tables 1 and 2 is described below. An MPDU #1 includes an MSDU #1 and thus, the transmit end constructs an FPI of the MPDU #1 including only fixed field information set as SN=1, FC=00, and LAST=1. Also, an MPDU #2 includes only a part of an MSDU #2 and thus, the transmit end constructs an FPI of the MPDU #2 including only fixed field information set as SN=2, FC=01, and LAST=1. Also, an MPDU #3 includes a part of the MSDU #2 and an MSDU #3 and thus, the transmit end constructs an FPI of the MPDU #3 including both fixed field information and variable field information. The fixed field information is set as SN=3, FC=10, and LAST=0. The variable field information is set as LEN=length information (byte) on MSDU #2 included in MPDU #3 and LAST=1.

The MPDU includes an MPDU data portion, an FPI, and a GMH including length information on the MPDU. At this time, the receive end can acquire a length of the MPDU through the GMH. Thus, the transmit end does not include the length information on the MPDU in the FPI. For example, the receive end can acquire a length of the MPDU #3 through a GMH of the MPDU #3. Thus, the transmit end constructs variable information of an FPI including only length information on one of two MSDUs constituting the MPDU #3.

The following description is made of an exemplary method for constructing an MPDU in a transmit end.

Figure 4:
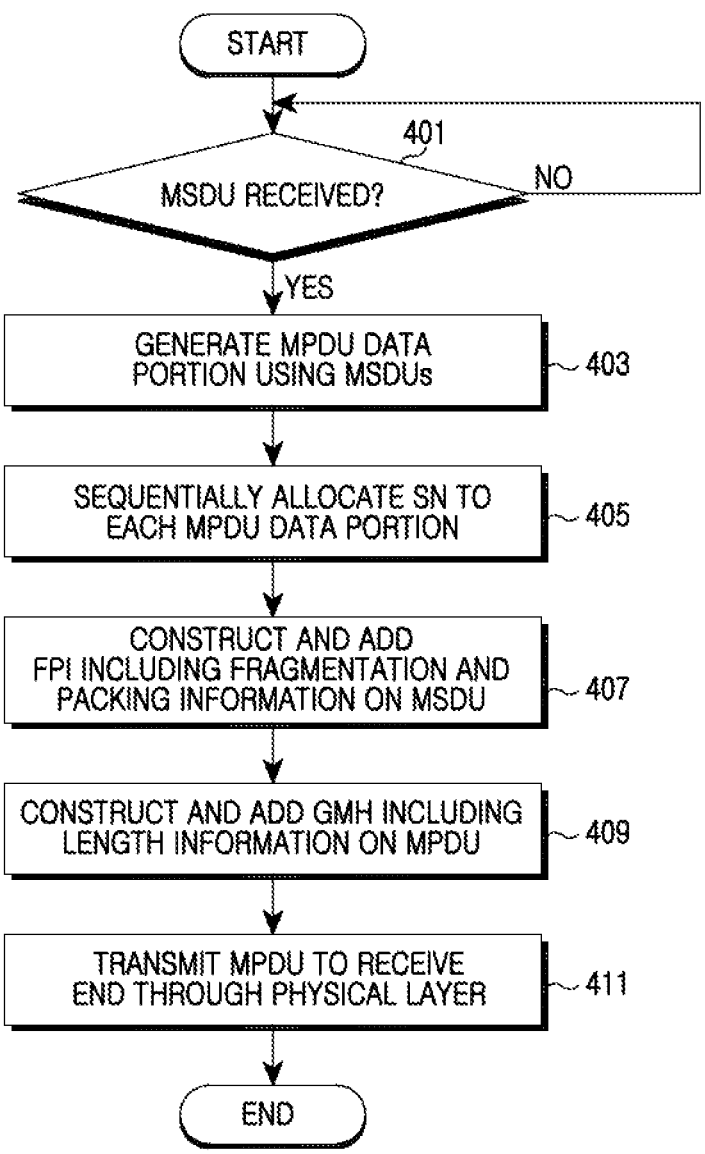
FIG. 4 illustrates a procedure for constructing an MPDU in a wireless communication system according to an exemplary embodiment of the present invention.

FIG. 4 illustrates a procedure for constructing an MPDU in a wireless communication system according to an exemplary embodiment of the present invention.

Referring to FIG. 4, in step 401, the transmit end determines if a MAC layer receives an MSDU from an upper layer.

If it is determined that the MAC layer receives the MSDU, the transmit end proceeds to step 403 and generates an MPDU data portion according to scheduling information of the MAC layer. For example, as illustrated in FIG. 2, the transmit end fragments an MSDU #1 according to resource scheduling information of the MAC layer and generates an MPDU #1 data portion including a part of the MSDU #1. Also, the transmit end fragments an MSDU #2 and generates an MPDU #2 data portion including a remaining part of the MSDU #1 and a part of the MSDU #2. Also, the transmit end generates an MPDU #3 data portion including a remaining part of the MSDU #2. Of course, it is to be understood that this fragmentation and generation scheme is merely an example for description such that the number of MSDUs fragmented and the number of MPDUs generated may vary.

After generating the MPDU data portion, the transmit end proceeds to step 405 and allocates SNs to the generated MPDU data portions. At this time, the transmit end sequentially allocates the SNs to the MPDU data portions. For example, if applying ARQ, the transmit end sets one MPDU as one ARQ block and thus uses the SNs allocated to the MPDU data portions as ARQ sequence numbers. On the other hand, if not applying the ARQ, the transmit end uses the SNs allocated to the MPDU data portions as sequence information for constructing MSDUs in sequence. Also, irrespective of ARQ application or non-application, the transmit end may use the SNs allocated to the MPDU data portions for use in arranging a sequence of an MPDU in Hybrid ARQ (HARQ).

In step 407, the transmit end constructs an FPI including fragmentation and packing information on an MSDU constituting each MPDU data portion, and adds the FPI to each MPDU data portion. For example, as illustrated in FIG. 3B, the transmit end constructs an FPI for each MPDU data portion with fixed field 300 information or variable field 310 information depending on the number of MSDUs constituting the MPDU data portion. After that, the transmit end adds a corresponding FPI to each MPDU data portion and generates an MPDU payload.

After generating the MPDU payload, in step 409, the transmit end constructs a GMH with length information on an MPDU, Connection IDentifier (CID) or Flow ID (FID) information, etc. and adds the GMH to each MPDU payload, thus generating an MPDU. Here, the length information on the MPDU may include length information on the MPDU payload, or length information on the MPDU payload and the GMH.

In step 411, the transmit end constructs data of a physical layer with the MPDUs, and transmits the data to a receive end. For example, the transmit end constructs a PHYsical Protocol Data Unit (PPDU) with one or more MPDUs and then transmits the PPDU to the receive end.

Then, the transmit end terminates the procedure according to an exemplary embodiment of the present invention.

As described above, the transmit end fragments and packs an MSDU according to scheduling information of a MAC layer and performs ARQ by generated MPDU. However, if an error occurs in data transmitted to the receive end, the transmit end may fragment and retransmit an erroneous MPDU depending on a wireless channel environment as illustrated in FIGS. 5A through 5D.

FIGS. 5A through 5D illustrate a construction of a retransmission MPDU in a wireless communication system according to an exemplary embodiment of the present invention.

Figure 5A:
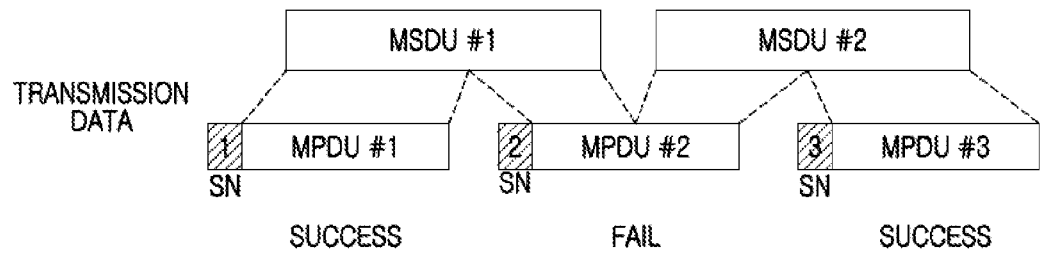
FIGS. 5A through 5D illustrate a construction of a retransmission MPDU in a wireless communication system according to an exemplary embodiment of the present invention.
Figure 5B:
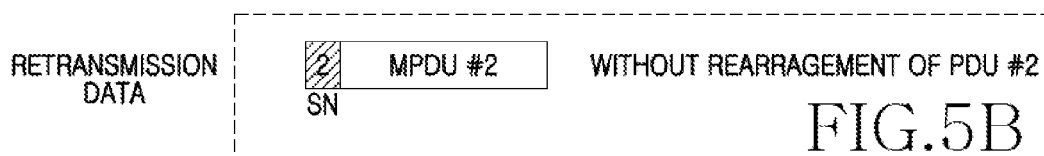
Figure 5C:
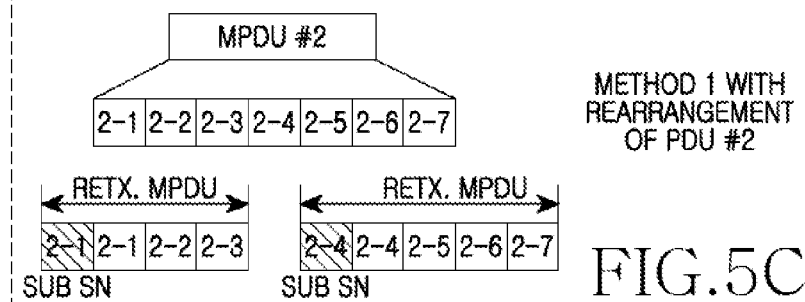
Figure 5D:
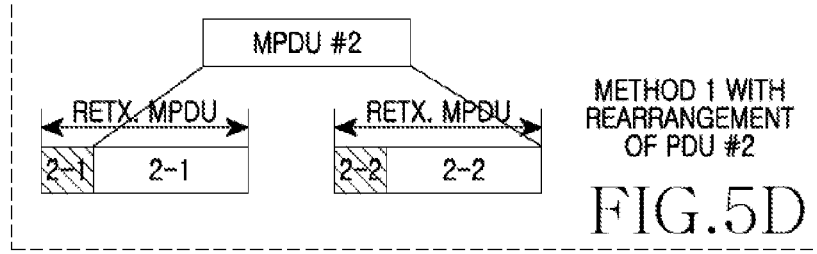

FIG. 5A illustrates a construction of transmission data, and FIGS. 5B through 5D illustrate a construction of retransmission data.

As illustrated in FIG. 5A, if a MAC layer of a transmit end receives two MSDUs from one connection of an upper layer, the transmit end reconstructs the two MSDUs according to scheduling information of the MAC layer, and generates three MPDU data portions. After that, the transmit end adds an FPI and GMH to each MPDU data portion, and generates MPDUs. At this time, if applying ARQ to the MPDUs, the transmit end uses SNs allocated the MPDUs as ARQ block SNs. That is, the transmit end sets one MPDU data portion as one ARQ block.

If an error occurs in an MPDU #2 among the MPDUs transmitted by the transmit end, a receive end sends a request for retransmission of the original MPDU #2 to the transmit end through ARQ feedback.

The transmit end may retransmit the original of an erroneous MPDU to the receive end or may fragment and retransmit the erroneous MPDU. For example, if an error occurs in the MPDU #2 transmitted to the receive end, as illustrated in FIG. 5B, the transmit end can retransmit the original of the erroneous MPDU #2 to the receive end. That is, the transmit end can retransmit an MPDU having the same construction as when initially transmitting the MPDU #2, to the receive end.

In another example, if an error occurs in the MPDU #2 transmitted to the receive end, as illustrated in FIG. 5C, the transmit end fragments the MPDU #2 into ARQ sub blocks of a fixed length for retransmission. That is, the transmit end fragments the MPDU #2 into seven ARQ sub blocks having a fixed length. The transmit end constructs a first retransmission MPDU data portion with three ARQ sub blocks, and constructs a second retransmission MPDU data portion with four ARQ sub blocks. At this time, the transmit end allocates each ARQ sub block a sub SN including an SN of the MPDU #2. Here, the sub SN is used as a sub SN of the ARQ sub block if the transmit end applies ARQ.

The transmit end constructs an FPI of a retransmission MPDU with the lowest sub SN among the sub SNs of the ARQ sub blocks constituting the retransmission MPDU, and adds the FPI to a retransmission MPDU data portion. In the following description, a Retransmission FPI (RFPI) represents an FPI including a sub SN among the FPIs of the retransmission MPDUs.

If the transmit end fragments an erroneous MPDU into ARQ sub blocks of a fixed length, upon occurrence of an error in a retransmission MPDU, the transmit end can perform retransmission in a unit of ARQ sub block.

As another example, if an error occurs in the MPDU #2 transmitted to the receive end, the transmit end may fragment the MPDU #2 into ARQ sub blocks of a variable length for retransmission as illustrated in FIG. 5D. That is, the transmit end fragments the MPDU #2 into two ARQ sub blocks having a variable length. At this time, the transmit end can construct one retransmission MPDU with one ARQ sub block. Also, the transmit end allocates SN=2 and sub SN=1 to a first ARQ sub block, and allocates SN=2 and sub SN=2 to a second ARQ sub block.

The transmit end constructs an RFPI with the sub SN allocated the ARQ sub block, and adds the RFPI to a retransmission MPDU data portion.

If fragmenting an erroneous MPDU into ARQ sub blocks of a variable length, the transmit end may construct a retransmission MPDU suitably to resource conditions of a physical layer. If an error occurs in the retransmission MPDU, the transmit end cannot fragment the retransmission MPDU.

However, if fragmenting and retransmitting the retransmission MPDU, the transmit end has to additionally allocate a sub SN allocated to the retransmission MPDU and a sub SN for the sub SN to an ARQ sub block fragmenting the retransmission MPDU.

If fragmenting an erroneous MPDU data portion into ARQ sub blocks, the transmit end can fragment the erroneous MPDU data portion into the ARQ sub blocks of a fixed length or variable length. For instance, the transmit end can decide whether to fragment the erroneous MPDU data portion into ARQ sub blocks of a fixed length or to fragment into ARQ sub blocks of a variable length in an initial access (i.e., network entry) process, and transmit to the receive end. At this time, the transmit end can set an ARQ_SUB_BLOCK_SIZE depending on whether to fragment the MPDU data portion into the ARQ sub blocks of the fixed length or to fragment into the ARQ sub blocks of the variable length, and transmit to the receive end. Also, the transmit end may inform the receive end of whether to fragment the MPDU data portion into the ARQ sub blocks of the fixed length or to fragment into the ARQ sub blocks of the variable length, using the ARQ_SUB_BLOCK_SIZE and a separate control message.

In another instance, the receive end may decide whether to fragment an erroneous MPDU data portion into ARQ sub blocks of a fixed length or to fragment into ARQ sub blocks of a variable length in an initial access process, and transmit to the transmit end.

In still another instance, through negotiation, the transmit end and the receive end may decide whether to fragment the erroneous MPDU data portion into ARQ sub blocks of a fixed length or to fragment into ARQ sub blocks of a variable length.

Upon initial access, the ARQ_SUB_BLOCK_SIZE can be included in a control message that is transmitted/received by the transmit end and the receive end for the sake of capability negotiation. For example, the ARQ_SUB_BLOCK_SIZE may be included in a control message that is transmitted/received by the transmit end and the receive end for the sake of initial registration. For another example, the ARQ_SUB_BLOCK_SIZE may be included in a control message initially deciding a connection parameter between the transmit end and the receive end, such as a Dynamic Service Addition (DSA) or Dynamic Service Change (DSC). In yet another example, if a system decides an ARQ_SUB_BLOCK_SIZE, the ARQ_SUB_BLOCK_SIZE may be transmitted through a broadcast message.

If retransmitting an erroneous MPDU without fragmenting, the transmit end constructs a retransmission MPDU using an FPI of the erroneous MPDU without adding an RFPI. However, if fragmenting an erroneous MPDU data portion into ARQ sub blocks and constructing a retransmission MPDU with the ARQ sub blocks, the transmit end constructs an RFPI and adds the RFPI to a retransmission MPDU data portion. For example, the transmit end may construct the RFPI as illustrated in FIG. 6 below. Here, FIG. 6 below illustrates an exemplary construction of an RFPI when the transmit end fragments an erroneous MPDU into ARQ sub blocks of a fixed length. However, the same can be applied even when the transmit end fragments the erroneous MPDU into ARQ sub blocks of a variable length.

FIGS. 6A and 6B are diagrams illustrating a construction of an FPI for a retransmission MPDU in a wireless communication system according to an exemplary embodiment of the present invention.

FIG. 6A illustrates a construction of a retransmission MPDU, and FIG. 6B illustrates a construction of an RFPI.

As illustrated in FIG. 6A, if an error occurs in an MPDU #3 including a part of an MSDU #2 and an MSDU #3, a transmit end fragments the MPDU #3 into seven ARQ sub blocks having a fixed length. After that, the transmit end constructs a first retransmission MPDU data portion with three ARQ sub blocks, and constructs a second retransmission MPDU data portion with four ARQ sub blocks.

At this time, as illustrated in FIG. 6B, the transmit end constructs an RFPI with MSDU information constituting each retransmission MPDU data portion, and adds the RFPI to the each retransmission MPDU data portion.

As illustrated in FIG. 6B, the RFPI includes fixed field 600 information commonly included, and variable field 610 information included only at the time of packing MSDUs.

The fixed field 600 includes an SN field including an SN of an erroneous MPDU, a SUB SN field including a sub SN representing a sequence of a retransmission MPDU and ARQ sub block, a Last Fragment Inclusion Indicator (LFI) field representing the inclusion or non-inclusion of the last retransmission MPDU constructed through fragmentation of the erroneous MPDU, an FC field representing fragmentation or packing information on an MSDU constituting the retransmission MPDU, and a LAST field representing the existence or non-existence of the variable field 610.

The variable field 610 includes a LEN field representing length information on an MSDU constituting a retransmission MPDU, and a LAST field representing the existence or non-existence of an additional variable field 610. At this time, the variable field 610 is comprised of a successive combination of the LEN field and the LAST field depending on the number of the MSDUs constituting the retransmission MPDU. Here, the LEN field can represent information on a length of one MSDU or a length of a fragmented MSDU.

For example, the transmit end can construct the RFPI as illustrated in Table 3 below.

TABLE 3

| Syntax | Size (bit) | Notes |
| --- | --- | --- |
| RFPI{ | | |
| SN | xx | Sequence number of the current ARQ block in MPDU |
| SUB-SN | yy | First ARQ sub block sequence number among ARQ sub block in MPDU |
| LFI | 1 | LFI is Last retransmission MPDU Fragment Indicator<br>0 = This MPDU does not includes last fragment of retransmission MPDU<br>1 = This MPDU includes last fragment of retransmission MPDU |
| FC | 2 | See table 2 for details of this field |
| LAST | 1 | 0 = More Packing Info in the list<br>1 = No Packing Info in the list |
| While(!LAST){ | | |
| LAST | 1 | |
| LENGTH | zz | Length of one SDU or SDU fragment packed in MPDU payload in bytes |
| } | | |
| Reserved | | Byte alignment |
| } | | |

Here, the RFPI includes an SN field including an SN of an ARQ block of an erroneous MPDU, a SUB SN field including a sub SN of a first ARQ sub block of the lowest sub SN within a retransmission MPDU, an LFI field representing the inclusion or non-inclusion of the last retransmission ARQ sub block of the highest sub SN among sub SNs of ARQ sub blocks constructed through fragmentation of an erroneous MPDU data portion, an FC field representing fragmentation or packing information on an MSDU constituting the retransmission MPDU, a LAST field representing the existence or non-existence of a variable field, a LEN field representing length information on the MSDU constituting the retransmission MPDU if the variable field exists, and a LAST field representing the existence or non-existence of an additional variable field. At this time, the variable field is comprised of a successive combination of the LEN field and the LAST field depending on the number of the MSDUs constituting the retransmission MPDU. Here, the LEN field can represent information on a length of one MSDU or a length of a fragmented MSDU.

An exemplary case of constructing RFPIs of retransmission MPDUs of FIG. 6A using Tables 2 and 3 is described below. A first retransmission MPDU #3 for an MPDU #3 includes an MSDU #2 and a part of an MSDU #3 and thus, the transmit end constructs an RFPI of the first retransmission MPDU #3 with both fixed field information and variable field information. The fixed field information is set as SN=3, sub SN=1, LFI=0, FC=11, and LAST=0. The variable field information is set as LEN=length information (byte) on the MSDU #2 included in the first retransmission MPDU #3 and LAST=1. At this time, a receive end can acquire a length of the retransmission MPDU through a GMH. Thus, the transmit end constructs variable information of an RFPI with only length information on one of two MSDUs constituting the first retransmission MPDU #3.

Also, a second retransmission MPDU #3 for the MPDU #3 includes a remaining part of the MSDU #3 and thus, the transmit end constructs an RFPI of the second retransmission MPDU #3 with only fixed field information set as SN=3, sub SN=2, LFI=1, FC=10, and LAST=1. At this time, the receive end can acquire a length of the retransmission MPDU through a GMH. Thus, the transmit end does not include separate length information in the RFPI for the second retransmission MPDU #3.

The following description is made for a method for constructing a retransmission MPDU in a transmit end.

Figure 7:
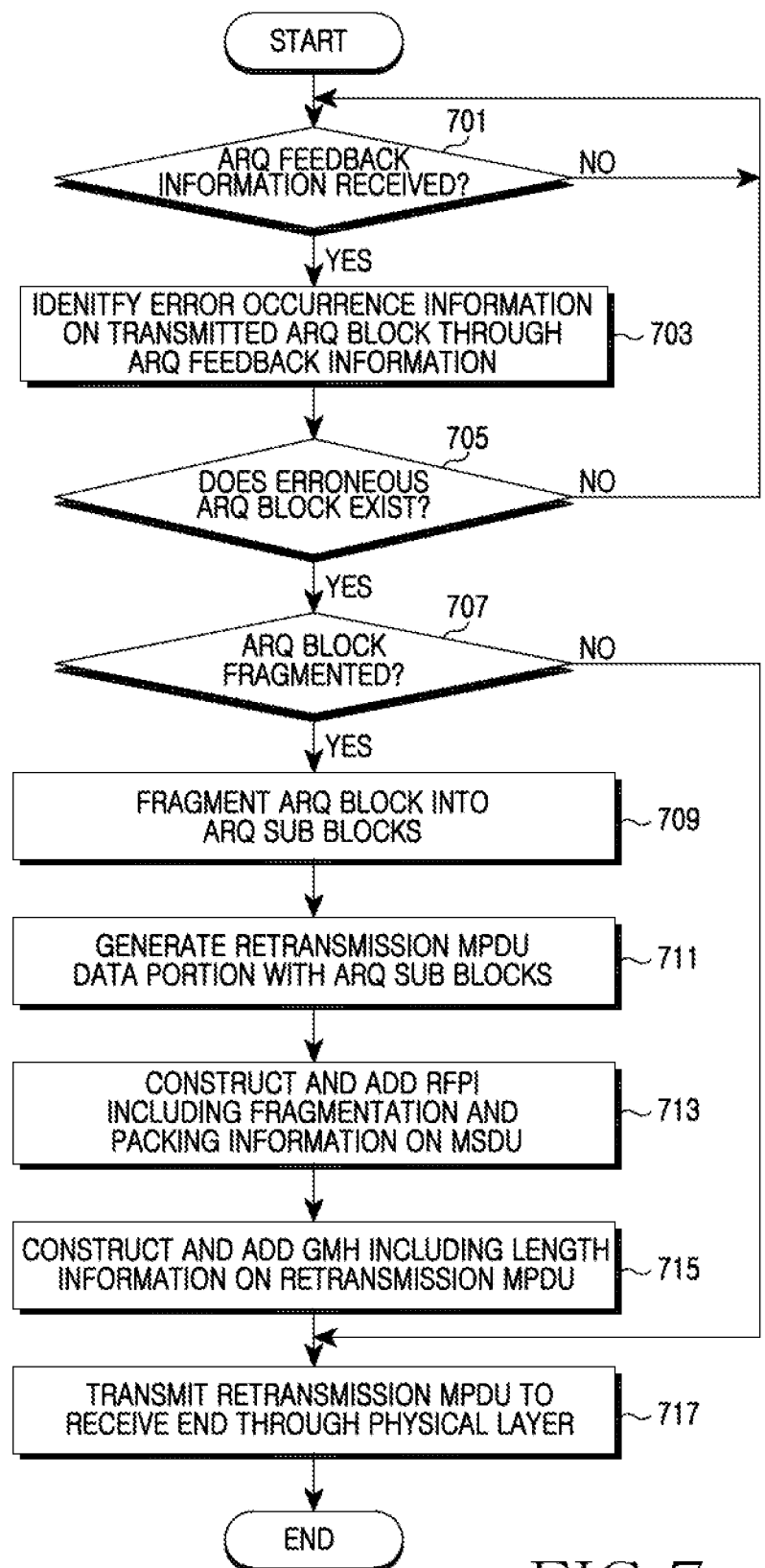
FIG. 7 illustrates a procedure for constructing a retransmission MPDU in a wireless communication system according to an exemplary embodiment of the present invention.

FIG. 7 illustrates a procedure for constructing a retransmission MPDU in a wireless communication system according to an exemplary embodiment of the present invention.

Referring to FIG. 7, in step 701, a transmit end determines if ARQ feedback information is received from a receive end receiving data.

If it is determined that the ARQ feedback information is received, the transmit end proceeds to step 703 and, through the ARQ feedback information, determines if an error occurs in ARQ blocks transmitted to the receive end. At this time, the transmit end performs ARQ by MPDU and thus recognizes one ARQ block as one MPDU data portion.

The transmit end proceeds to step 705 and determines if there is an ARQ block to be retransmitted depending on the error occurrence or non-occurrence determined in step 703.

If it is determined that there is no ARQ block to be retransmitted, the transmit end returns to step 701 and determines if ARQ feedback information is received. If it is determined that there is data to be transmitted to the receive end, in step 701, the transmit end waits to receive ARQ feedback information while continuing to transmit ARQ blocks. Then, the transmit end determines if ARQ feedback information is received responsive to the transmitted ARQ blocks. That is, the transmit end returns to step 701 and determines if ARQ feedback information responsive to ARQ blocks suffering a failure of ARQ feedback information reception is received.

On the other hand, if it is determined in step 705 that there is an ARQ block to be retransmitted, the transmit end proceeds to step 707 and decides whether to fragment an erroneous ARQ block into ARQ sub blocks for retransmission. At this time, the transmit end decides whether to fragment an ARQ block to be retransmitted into ARQ sub blocks depending on a wireless resource management scheme of a scheduler. For example, if intending to more robustly transmit an ARQ block to a wireless channel than initially transmitted, the transmit end decides to fragment the ARQ block to be retransmitted into ARQ sub blocks.

If it is decided not to fragment the ARQ block to be retransmitted into the ARQ sub blocks, in step 717, the transmit end constructs an MPDU with the erroneous ARQ block substantially identical to that initially transmitted, and retransmits the MPDU to the receive end. That is, the transmit end constructs a retransmission MPDU data portion substantially identical with the original MPDU data portion. Also, the transmit end constructs an FPI and GMH of the retransmission MPDU substantially identical with an FPI and GMH of the original MPDU.

On the other hand, if deciding to fragment the ARQ block to be retransmitted into the ARQ sub blocks, the transmit end proceeds to step 709 and fragments the ARQ block to be retransmitted into the ARQ sub blocks. For example, as illustrated in FIG. 5C, the transmit end fragments the ARQ block into ARQ sub blocks of a fixed length. In another example, as illustrated in FIG. 5D, the transmit end fragments the ARQ block into ARQ sub blocks of a variable length.

After fragmenting the ARQ block to be retransmitted into the ARQ sub blocks, the transmit end proceeds to step 711 and constructs a retransmission MPDU data portion with the ARQ sub blocks. For example, if fragmenting the ARQ block into the ARQ sub blocks of the fixed length as illustrated in FIG. 5C, the transmit end constructs a retransmission MPDU data portion with one or more ARQ sub blocks. In another example, if fragmenting the ARQ block into the ARQ sub blocks of the variable length as illustrated in FIG. 5D, the transmit end sets one ARQ sub block as one retransmission MPDU data portion.

In step 713, the transmit end constructs an RFPI with fragmentation and packing information on an MSDU constituting each retransmission MPDU data portion, and adds the RFPI to the retransmission MPDU data portion. In another example, as illustrated in FIG. 6B, the transmit end constructs an RFPI by retransmission of MPDU data portion with fixed field 600 information and variable field 610 information depending on the number of the MSDUs constituting the retransmission MPDU data portion.

In step 715, the transmit end adds a GMH, and constructs the retransmission MPDU.

In step 717, the transmit end constructs data of a physical layer with the retransmission MPDUs, and transmits the data to the receive end. For example, the transmit end constructs a PPDU with the retransmission MPDUs or constructs a PPDU with both a transmission MPDU and the retransmission MPDUs. Then, the transmit end transmits the PPDU to the receive end.

Then, the transmit end terminates the procedure according to an exemplary embodiment of the present invention.

The following description is made for an exemplary method for reconstructing an MSDU in a receive end.

Figure 8:
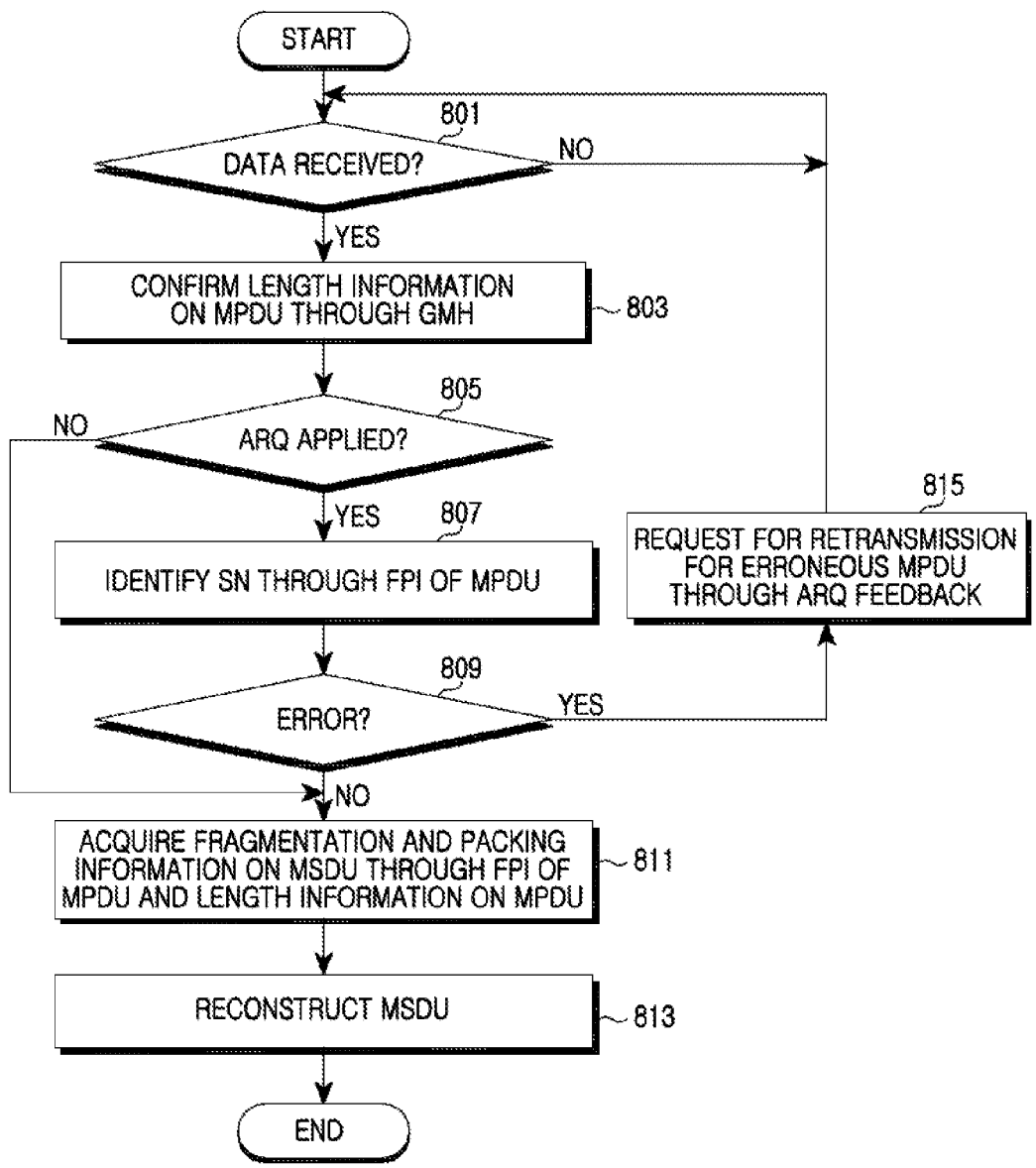
FIG. 8 illustrates a procedure for reconstructing a MAC Service Data Unit (MSDU) in a receive end of a wireless communication system according to an exemplary embodiment of the present invention.

FIG. 8 illustrates a procedure for reconstructing an MSDU in a receive end of a wireless communication system according to an exemplary embodiment of the present invention.

Referring to FIG. 8, the receive end proceeds to step 801 and determines if data is received from a transmit end.

If it is determined that the data is received, the receive end proceeds to step 803 and, through a GMH, identifies length information on an MPDU and CID information. For example, the receive end separates MPDUs from a physical layer signal received from the transmit end. After that, the receive end identifies a length of each MPDU through the GMH. Here, the length of the MPDU represents a total length of the MPDU or a length excepting the GMH from the MPDU. The length excepting the GMH represents a length of an FPI and MPDU data portion. If MPDU-related control information not described is included in a form of another additional header or sub-header, the length excepting the GMH may represent a length including an FPI, an MPDU data portion, and another additional header information.

After identifying the length of the MPDU, the receive end proceeds to step 805 and determines if it applies an ARQ technique for a CID of the MPDU with the transmit end.

If it is determined that the ARQ technique is not applied, the receive end proceeds to step 811 and acquires fragmentation and packing information on MSDUs constituting each MPDU using an FPI of the MPDU and the length information on the MPDU identified in step 803.

On the other hand, if it is determined in step 805 that the ARQ technique is applied, the receive end proceeds to step 807 and identifies SNs of ARQ blocks through an FPI or RFPI of each MPDU.

In step 809 the receive end determines if there is an ARQ block not received among ARQ blocks intended for reception. For example, the receive end determines reception of ARQ blocks using SNs or sub SNs of the ARQ blocks. At this time, if SNs or sub SNs of received ARQ blocks are not in order, the receive end determines that an error occurs in an ARQ block of an unidentified SN. In this case, the receive end decides not to reconstruct an MSDU. Also, the receive end may decide to reconstruct an MSDU only up to an ARQ block of a sequential SN or sub SN.

In another example, if the SNs or sub SNs of the received ARQ blocks are in order, the receive end determines if an error occurs in the ARQ block. If the error occurs in the ARQ block, the receive end decides not to reconstruct an MSDU. Also, the receive end may decide to reconstruct an MSDU only up to an ARQ block having a lower SN or sub SN than the erroneous ARQ block.

If it is determined that the error occurs in the ARQ block in step 809, the receive end proceeds to step 815 and informs the transmit end of erroneous ARQ block information through ARQ feedback. That is, the receive end sends a request for retransmission for an erroneous ARQ block to the transmit end through the ARQ feedback.

Then, the receive end returns to step 801 and determines if an MPDU including the erroneous ARQ block is received from the transmit end.

On the other hand, if it is determined that the error does not occur in the ARQ block in step 809, the receive end proceeds to step 811 and acquires fragmentation and packing information on MSDUs constituting each MPDU, using an FPI or RFPI of the MPDU and length information on the MPDU. For example, if a fixed field of the FPI is set as SN=1, FC=00, and LAST=1, the receive end recognizes that an MPDU of SN=1 includes an MSDU #1. That is, the receive end recognizes that the MPDU of SN=1 has the same length as the MSDU #1.

Also, if the fixed field of the FPI is set as SN=2, FC=01, and LAST=1, the receive end recognizes that an MPDU of SN=2 includes a part of an MSDU #2. That is, the receive end recognizes that the MPDU of SN=2 has the same length as the part of the MSDU #2.

Also, if the fixed field of the FPI is set as SN=3, FC=10, and LAST=0 and a variable field is set as LEN=length information (byte) on the MSDU #2 included in the MPDU #3 and LAST=1, the receive end recognizes that an MPDU of SN=3 includes a part of an MSDU #2 and an MSDU #3. That is, the receive end can identify a length of the part of the MSDU #2 included in the MPDU of SN=3 depending on a length (LEN) of the variable field. After that, the receive end recognizes that a length difference between the MPDU #3 and the part of the MSDU #2 included in the MPDU #3 is equal to a length of the MSDU #3.

After acquiring the fragmentation and packing information on the MSDUs, the receive end proceeds to step 813 and reconstructs an MSDU using the fragmentation and packing information on the MSDUs.

Then, the receive end terminates the procedure according to an exemplary embodiment of the present invention.

In the aforementioned exemplary embodiment of the present invention, if an error does not occur in an ARQ block, the receive end proceeds to step 811 and acquires fragmentation and packing information on MSDUs constituting each MPDU using an FPI or RFPI of the MPDU and length information on the MPDU.

In another exemplary embodiment of the present invention, even when deciding to reconstruct an MSDU up to an ARQ block having a lower SN or sub SN than an ARQ block before the occurrence of an error, the receive end can proceed to step 811 and acquire fragmentation and packing information on MSDUs constituting each MPDU using an FPI or RFPI of the MPDU and length information on the MPDU.

As described above, the transmit end adds a GMH and an FPI or RFPI to an MPDU data portion so that the receive end can reconstruct an MSDU. At this time, a size of a LEN field included in the GMH, FPI, and RFPI is decided to be proportional to a length of the MPDU configurable to the maximum. Also, the size of the LEN field included in the GMH, FPI, and RFPI may be decided depending on a size of a PPDU. For example, when a physical layer uses a plurality of frequency carriers, the size of the LEN field included in the GMH, FPI, and RFPI increases more than when the physical layer uses one frequency carrier. That is, when assuming that a size of an MPDU transmissible through one frequency carrier is equal to 2048 bytes, it is decided that the size of the LEN field included in the GMH, FPI, and RFPI is equal to 11 bits. However, if the physical layer uses two frequency carriers, it is decided that the size of the LEN field included in the GMH, FPI, and RFPI is equal to 12 bits. Also, if the physical layer uses four frequency carriers, it is decided that the size of the LEN field included in the GMH, FPI, and RFPI is equal to 13 bits.

For another example, the size of the LEN field included in the GMH, FPI, and RFPI can be decided depending on the number of antennas. That is, the size of the LEN field included in the GMH, FPI, and RFPI increases as the number of antennas increases.

As described above, the transmit end constructs an FPI with MSDU information constituting an MPDU, and constructs an RFPI with MSDU information constituting a retransmission MPDU. At this time, as illustrated in FIG. 9 below, the transmit end can construct the FPI and RFPI in a form of an Extended Header (EH), and add the FPI and RFPI to an MPDU data portion.

Figure 9:
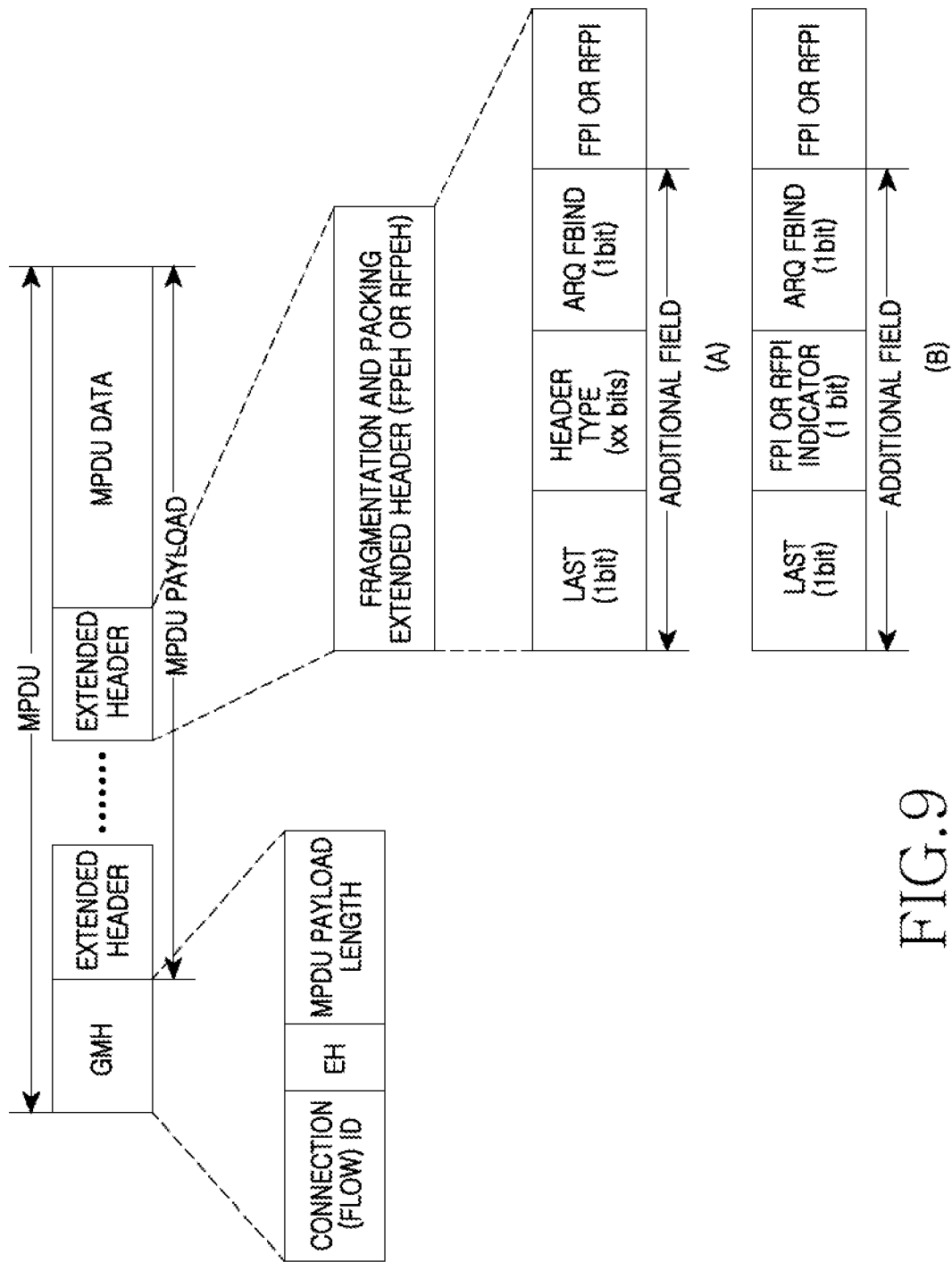
FIG. 9 illustrates a structure of an Extended Header (EH) for constructing an FPI or Retransmission FPI (RFPI) for an MPDU in a wireless communication system according to an exemplary embodiment of the present invention.

FIG. 9 illustrates a structure of an EH for constructing an FPI or RFPI for an MPDU in a wireless communication system according to an exemplary embodiment of the present invention.

As illustrated in FIG. 9, an MPDU is comprised of a GMH and an MPDU payload.

The GMH includes a CID field including CID (or FID) information, an EH field representing the existence or non-existence of an EH, and a length field representing length information on the MPDU. Here, the length field represents length information on the MPDU or length information on the MPDU payload.

The MPDU payload is comprised of an EH and an MPDU data portion. The EH includes several pieces of control information. The MPDU data portion includes MSDU information. Here, the EH may not be included in the MPDU payload.

A transmit end can include an FPI or RFPI in an MPDU in the form of an EH. In the following exemplary description, a Fragmentation and Packing Extended Header (FPEH) represents an EH including FPI information, and a Retransmission FPEH (RFPEH) represents an EH including RFPI information.

The MPDU payload may include a plurality of EHs including different control information. Thus, the transmit end constructs the FPEH or RFPEH in the form of FIG. 9A or 9B so that a receive end receiving an MPDU can distinguish the FPEH and RFPEH.

As illustrated in FIG. 9A, the FPEH includes at least one of a LAST field, a header type field, an ARQ indicator field, and FPI information. The RFPEH includes at least one of a LAST field, a header type field, an ARQ indicator field, and RFPI information.

The LAST field represents the existence or non-existence of an additional EH. For example, if the additional EH exists next to an EH including FPEH or RFPEH information, the transmit end sets the LAST field to '1'. On the other hand, if the additional EH does not exist next to the EH including the FPEH or RFPEH information, the transmit end sets the LAST field to '0'.

The header type field represents the type of an EH. For example, the header type field represents whether the EH is equal to an FPEH or RFPEH. In another example, the header type field may represent an EH of a different type. In this case, the number of bits of the header type field is decided depending on the number of EHs.

The ARQ indicator field represents whether ARQ feedback information is included in an MPDU data portion. For example, if the MPDU includes the ARQ feedback information, the transmit end positions the ARQ feedback information in a front part of the MPDU data portion so that the ARQ feedback information is distinguished from MSDU information constituting the MPDU data portion.

As further illustrated in FIG. 9B, the FPEH includes at least one of a LAST field, an FPI indicator or RFPI indicator field, an ARQ indicator field, and FPI information. The RFPEH includes at least one of a LAST field, an FPI indicator or RFPI indicator field, an ARQ indicator field, and RFPI information.

If the FPEH or RFPEH is constructed as illustrated in FIG. 9B, the FPEH or RFPEH does not include a header type field and thus a few assumptions are required as follows:

First, an FPI and an RFPI do not simultaneously exist in one MPDU;

Second, if a plurality of EHs exist in an MPDU, an FPEH or RFPEH is positioned in the last of the plurality of EHs; and Third, a receive end can determine the existence or non-existence of an FPI or RFPI within an MPDU through a CID included in a GMH.

Thus, if the FPEH or RFPEH is constructed as illustrated in FIG. 9B, the LAST field representing the existence or non-existence of an additional EH is set by '1'.

As described above, the transmit end constructs an FPEH or an RFPEH in the form of FIG. 9A or 9B so that the receive end can distinguish the FPEH and the RFPEH. At this time, the transmit end may either construct the FPEH or RFPEH in any of the forms of FIGS. 9A and 9B or construct the FPEH or RFPEH using all the forms of FIG. 9. For example, if constructing the FPEH or RFPEH using all the forms of FIG. 9, the transmit end decides a list of CIDs always including an FPEH or RFPEH during a network entry process of the receive end. Accordingly, the transmit end constructs an FPEH and RFPEH for a CID, which is included in the list of CIDs always including the FPEH or RFPEH, in the form of FIG. 9B. On the other hand, the transmit end constructs an FPEH and RFPEH for a CID, which is not included in the list of CIDs always including the FPEH or RFPEH, in the form of FIG. 9A.

If constructing the FPEH or RFPEH as in FIG. 9B, the transmit end constructs the FPEH or RFPEH meeting the above condition. In this case, the receive end can identify the FPI or RFPI as illustrated in FIG. 10 below.

Figure 10:
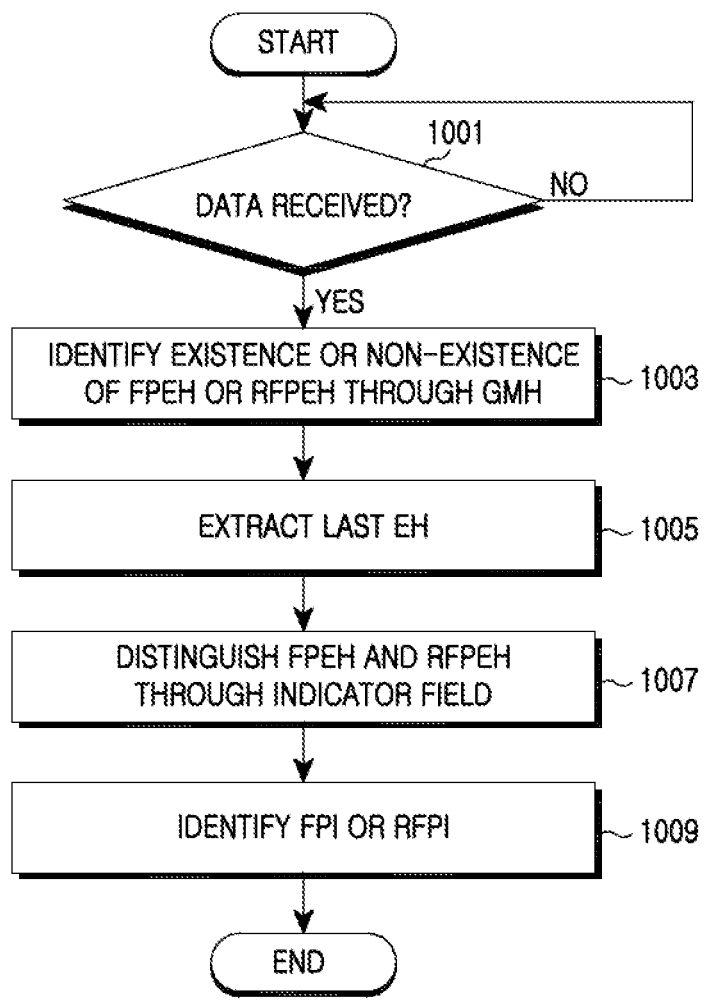
FIG. 10 illustrates a procedure for identifying an FPI or RFPI of an EH in a receive end of a wireless communication system according to an exemplary embodiment of the present invention.

FIG. 10 illustrates a procedure for identifying an FPI or RFPI of an EH in a receive end of a wireless communication system according to an exemplary embodiment of the present invention.

Referring to FIG. 10, in step 1001, the receive end determines if data is received from a transmit end.

If it is determined that the data is received, the receive end proceeds to step 1003 and, through a CID included in a GMH, identifies if an FPEH or RFPEH is included in an EH of an MPDU. For example, through the CID included in the GMH, the receive end can determine if the FPEH or RFPEH is included in the EH of the MPDU if the receive end includes a list of CIDs always including an FPEH or RFPEH.

If the FPEH or RFPEH is included in the EH of the MPDU, the receive end proceeds to step 1005 and extracts the last EH among EHs included in the MPDU. For example, if the FPEH or RFPEH is constructed as in FIG. 9B, the FPEH or RFPEH is positioned in the last of the EHs of the MPDU. Thus, the receive end extracts the EH of LAST field=1 among the EHs.

After extracting the last EH, in step 1007, the receive end identifies an indicator field of the extracted last EH, and determines the type of the last EH. For example, the receive end determines whether the last EH includes FPI or RFPI information, using the indicator field of the last EH.

After determining the type of the EH, the receive end proceeds to step 1009 and identifies the FPI or RFPI information included in the last EH.

Then, the receive end terminates the procedure according to an exemplary embodiment of the present invention.

In the aforementioned exemplary embodiment of the present invention, the receive end compares a CID identified through a GMH with a list of CIDs always including an FPEH or RFPEH, thus determining if an MPDU includes an FPEH or RFPEH. If the CID identified through the GMH is not included in the list of CIDs always including the FPEH or RFPEH, the receive end recognizes that the transmit end constructs the FPEH or RFPEH in a form of FIG. 9. Thus, the receive end can distinguish the FPEH and RFPEH through header type fields of EHs, thus identifying an FPI or RFPI.

The transmit end can integrate two or more MPDUs of a different CID and construct a multiplex MPDU. For example, the transmit end may integrate MPDUs for a plurality of connections into one multiplex MPDU as illustrated in FIG. 11.

Figure 11:
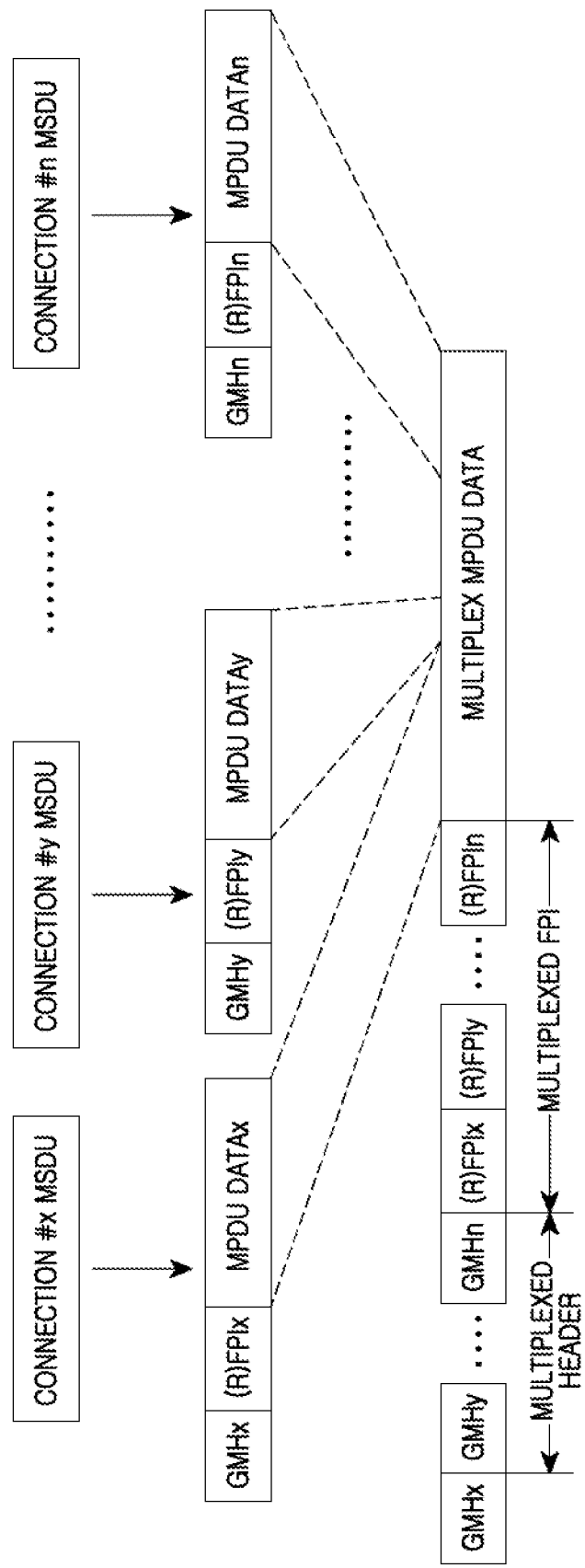
FIG. 11 illustrates a construction of a multiplex MPDU in a wireless communication system according to an exemplary embodiment of the present invention.

FIG. 11 illustrates a construction of a multiplex MPDU in a wireless communication system according to an exemplary embodiment of the present invention.

Referring to FIG. 11, MPDUs for a plurality of connections (x, y, . . . , n), and a multiplex MPDU integrating the MPDUs for the plurality of connections are illustrated.

As illustrated in FIG. 11, the transmit end can generate respective MPDUs for a plurality of connections included by itself.

As also illustrated in FIG. 11, the transmit end can integrate MPDUs for a plurality of CIDs into one multiplex MPDU, and transmit the multiplex MPDU to a receive end.

If constructing the multiplex MPDU, the transmit end constructs the multiplex MPDU with a GMH of an MPDU for each CID, an FPI or RFPI of the MPDU, and an MPDU data portion. For example, the transmit end generates a multiplexed GMH by packing GMHs for connections, generates a multiplexed FPI or RFPI by packing FPIs or RFPIs for the connections, and generates a multiplex MPDU data portion by packing MSDUs for the connections. In another example, the transmit end may pack the GMHs and the FPIs or RFPIs for the connections without distinguishing the GMHs and the FPIs or RFPIs.

At this time, the transmit end can set a GMH of a first connection among the CIDs as a header of a multiplex MPDU, and construct GMHs of other connections in a form of a multiplexed EH. Here, information constituting the multiplexed EH includes each connection information, and length information on an MPDU data portion for each connection.

Also, the transmit end can generate a multiplexed FPI by packing information on FPIs for respective connections, or generate a multiplexed RFPI by packing information on RFPIs. In another example, the transmit end may generate a multiplexed FPI by mixing FPI information and RFPI information for respective connections.

If constructing the multiplex MPDU as above, the transmit end can construct one multiplex MPDU and facilitate transmission without needing to transmit an MPDU by each connection. Thus, through the multiplex MPDU, the receive end can easily analyze MPDUs for a plurality of connections.

Also, if constructing the multiplex MPDU, the transmit end may encrypt only a multiplex MPDU data portion without encrypting a multiplexed GMH, a multiplexed EH, and a multiplexed FPI.

The following description is made of an exemplary construction of a multiplexed RFPI including RFPIs for a plurality of connections.

Figure 12:
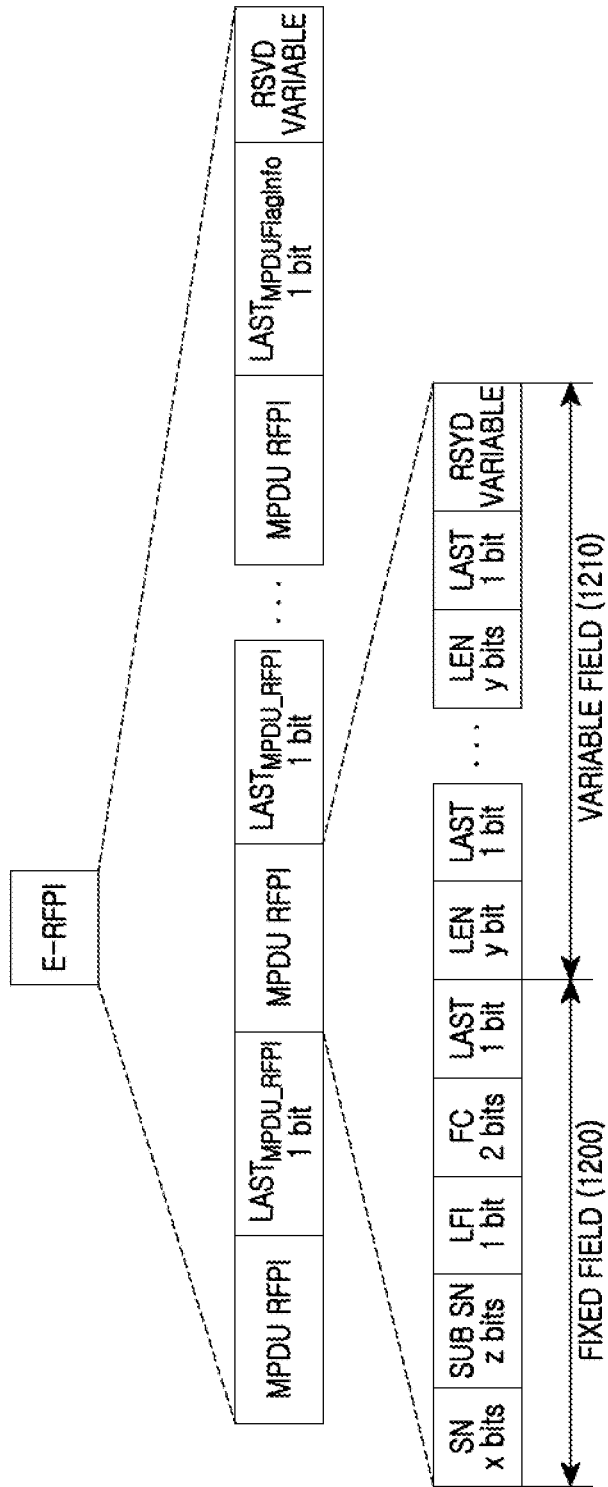
FIG. 12 illustrates a construction of an RFPI for a retransmission multiplex MPDU in a wireless communication system according to an exemplary embodiment of the present invention.

FIG. 12 illustrates a construction of an RFPI for a retransmission multiplex MPDU in a wireless communication system according to an exemplary embodiment of the present invention.

As illustrated in FIG. 12, RFPIs constituting a multiplexed RFPI have substantially the same constructions as RFPIs illustrated in FIGS. 6A and 6B. That is, an RFPI includes a fixed field 1200 having information commonly included, and a variable field 1210 having information included only at the time of packing MSDUs. However, among the RFPIs constituting the multiplexed RFPI, only the last RFPI includes a reserved bit for byte arrangement, and other RFPIs do not.

The following description is made of an exemplary construction of a transmit end for generating an MPDU or a retransmission MPDU.

Figure 13:
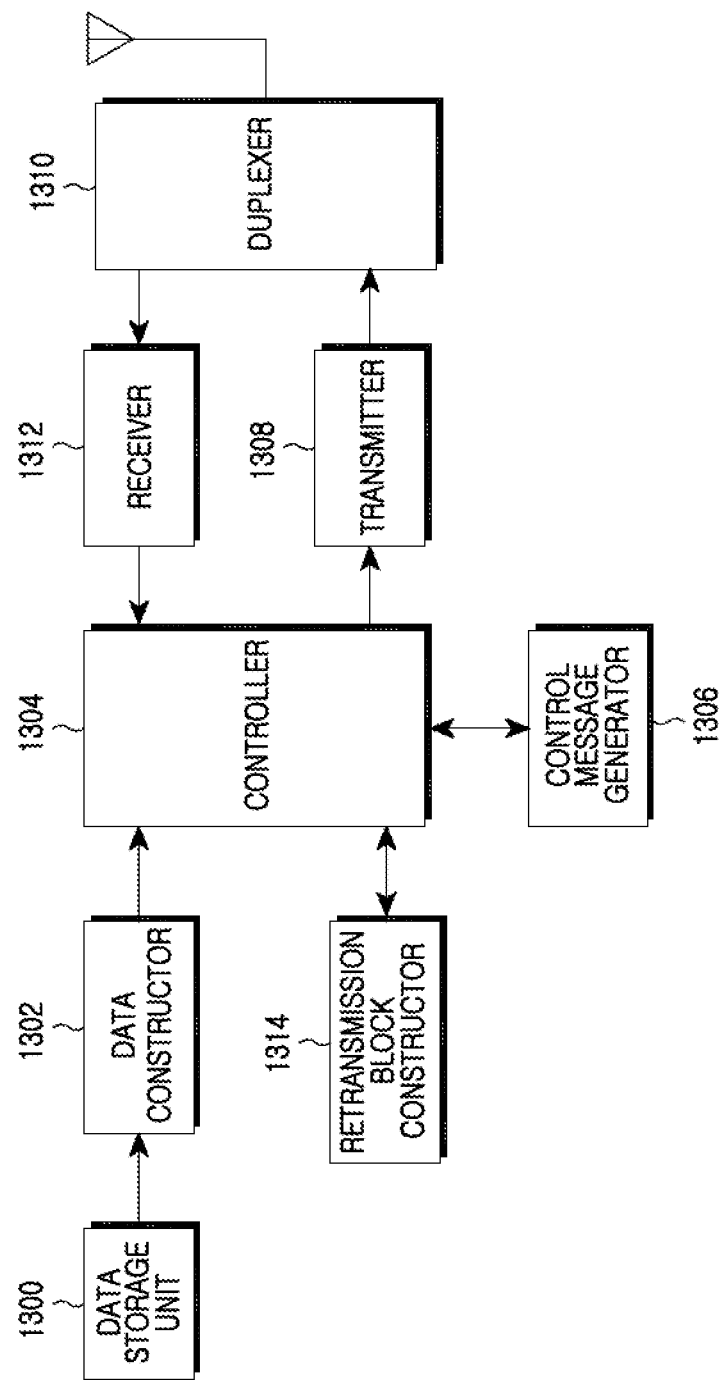
FIG. 13 illustrates a construction of a transmit end in a wireless communication system according to an exemplary embodiment of the present invention.

FIG. 13 illustrates a construction of a transmit end in a wireless communication system according to an exemplary embodiment of the present invention.

As illustrated in FIG. 13, the transmit end includes a data storage unit 1300, a data constructor 1302, a controller 1304, a control message generator 1306, a transmitter 1308, a duplexer 1310, a receiver 1312, and a retransmission block constructor 1314.

The data storage unit 1300 stores data generated in an upper application program. That is, the data storage unit 1300 stores MSDUs received from the upper application program. For example, the data storage unit 1300 is constructed in a form of a data queue.

The data constructor 1302 fragments and packs the MSDUs stored in the data storage unit 1300 according to resource scheduling information of a MAC layer, thus constructing an MPDU data portion. For example, as illustrated in FIG. 2, the data constructor 1302 fragments one MSDU received from an upper layer or packs one or more MSDUs or a part of an MSDU according to resource scheduling information of a MAC layer, thus generating an MPDU data portion.

The controller 1304 controls signal transmission/reception and ARQ of the transmit end, and sequentially allocates an SN to each MPDU data portion generated in the data constructor 1302. Here, if applying the ARQ, the controller 1304 controls the ARQ by MPDU and thus, uses an SN allocated to each MPDU as an ARQ sequence number.

The controller 1304 adds an FPI and GMH received from the control message generator 1306 to an MPDU data portion received from the data constructor 1302, thus generating an MPDU. After that, the controller 1304 constructs a PPDU with one or more MPDUs and provides the PPDU to the transmitter 1308.

The controller 1304 identifies error occurrence information on MPDUs transmitted to a receive end through ARQ feedback information received from the receive end, and controls retransmission of the MPDUs. At this time, the controller 1304 decides whether to fragment an erroneous MPDU data portion into ARQ sub blocks for retransmission.

If the controller 1304 decides to fragment the erroneous MPDU data portion into the ARQ sub blocks, the retransmission block constructor 1314 fragments a retransmission MPDU data portion into ARQ sub blocks. For example, as illustrated in FIG. 5C, the retransmission block constructor 1314 fragments an MPDU data portion into ARQ sub blocks of a fixed length. At this time, the retransmission block constructor 1314 constructs one or more retransmission MPDU data portions with one or more ARQ sub blocks. In another example, as illustrated in FIG. 5D, the retransmission block constructor 1314 fragments an MPDU data portion into ARQ sub blocks of a fixed length. At this time, the retransmission block constructor 1314 sets one ARQ sub block as one retransmission MPDU.

Under control of the controller 1304, the control message generator 1306 constructs an FPI with MSDU information constituting an MPDU data portion, length information on the MPDU, and a GMH including CID information. For example, the control message generator 1306 constructs the FPI as illustrated in FIG. 3B. Here, a length of the MPDU represents a total length of the MPDU or a length of the MPDU data portion and the FPI.

If performing retransmission for an erroneous MPDU under control of the controller 1304, the control message generator 1306 constructs an RFPI with MSDU information constituting a retransmission MPDU data portion, and constructs a GMH with length information on the retransmission MPDU and CID information. For example, the control message generator 1306 constructs the RFPI as illustrated in FIG. 6B. Here, a length of the retransmission MPDU represents a total length of the retransmission MPDU or a length of the retransmission MPDU data portion and the RFPI.

Also, if the retransmission block constructor 1314 fragments an MPDU data portion into ARQ sub blocks of a fixed length, the control message generator 1306 constructs an RFPI with the lowest sub SN among sub SNs of the ARQ sub blocks constituting a retransmission MPDU data portion.

If the control message generator 1306 generates the RFPI as above, the controller 1304 adds the RFPI and GMH received from the control message generator 1306 to a retransmission MPDU data portion received from the retransmission block constructor 1314, thus generating a retransmission MPDU. Then, the controller 1304 constructs a PPDU with one or more retransmission MPDUs, and provides the PPDU to the transmitter 1308.

The transmitter 1308 includes a channel coding block, a modulating block, and an RF processing block. The transmitter 1308 converts a PPDU received from the ARQ controller 1304 into a high frequency signal, and transmits the high frequency signal to the received end through the duplexer 1310. For example, the channel coding block is comprised of a channel encoder, an interleaver, a modulator, etc. In an Orthogonal Frequency Division Multiplexing (OFDM) scheme, the modulating block is comprised of an Inverse Fast Fourier Transform (IFFT) operator. In a Code Division Multiple Access (CDMA) scheme, the modulating block is comprised of a code spreading modulator. The RF processing block converts a baseband signal received from the modulating block into a high frequency signal, and outputs the high frequency signal through an antenna.

According to a duplexing scheme, the duplexer 1310 transmits a transmission signal received from the transmitter 1308, through the antenna. The duplexer 1310 provides a reception signal from the antenna, to the receiver 1312.

The receiver 1312 includes an RF processing block, a demodulating block, a channel decoding block, etc. The receiver 1312 converts a high frequency signal received from the duplexer 1310 into a baseband signal, and demodulates the baseband signal. For example, the RF processing block converts a high frequency signal received from the duplexer 1310 into a baseband signal, and outputs the baseband signal. The demodulating block is comprised of an FFT operator for extracting data on each subcarrier from the signal received from the RF processing block, etc. The channel decoding block is comprised of a demodulator, a deinterleaver, a channel decoder, etc.

In the aforementioned construction, the controller 1304 can perform functions of the control message generator 1306 and the retransmission block constructor 1314. These are separately constructed and shown in order to distinguish and describe respective functions in the present invention. Thus, in an actual realization, construction can be such that all of them are processed in the controller 1304, and construction can be such that only part of them is processed in the controller 1304.

The following description is made of an exemplary construction of a receive end for reconstructing an MSDU.

Figure 14:
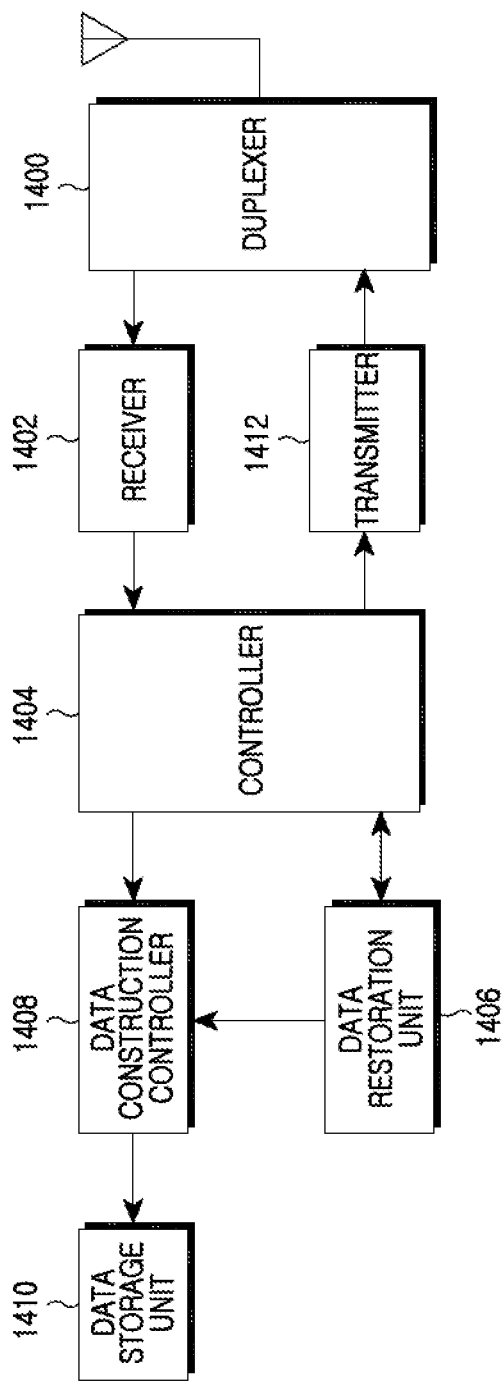
FIG. 14 illustrates a construction of a receive end in a wireless communication system according to an exemplary embodiment of the present invention.

FIG. 14 illustrates a construction of a receive end in a wireless communication system according to an exemplary embodiment of the present invention.

As illustrated in FIG. 14, the receive end includes a duplexer 1400, a receiver 1402, a controller 1404, a data construction controller 1406, a data restoration unit 1406, a data construction controller 1408, a data storage unit 1410, and a transmitter 1412.

According to a duplexing scheme, the duplexer 1400 transmits a transmission signal received from the transmitter 1412, through an antenna. The duplexer 1400 provides a reception signal from the antenna, to the receiver 1402.

The receiver 1402 includes an RF processing block, a demodulating block, a channel decoding block, etc. The receiver 1402 converts a high frequency signal received from the duplexer 1400 into a baseband signal, and demodulates the baseband signal. For example, the RF processing block converts a high frequency signal received from the duplexer 1400 into a baseband signal, and outputs the baseband signal. The demodulating block is comprised of a Fast Fourier Transform (FFT) operator for extracting data on each subcarrier from a signal received from the RF processing block, etc. The channel decoding block is comprised of a demodulator, a deinterleaver, a channel decoder, etc.

The controller 1404 fragments MPDUs from a PPDU received from the receiver 1402 and determines the occurrence or non-occurrence of an error in each MPDU. If an error occurs in the MPDU, the controller 1404 controls to transmit error occurrence information on the MPDU to a transmit end through ARQ feedback.

The controller 1404 transmits a GMH included in a no-error MPDU and an FPI or RFPI to the data construction controller 1408, and transmits an MPDU payload to the data restoration unit 1406.

The data construction controller 1408 acquires length information on an MPDU through the GMH received from the controller 1404. Also, the data construction controller 1408 acquires fragmentation and packing information on MSDUs constituting each MPDU data portion through the FPI or RFPI received from the controller 1404. For example, if a fixed field of the FPI is set as SN=1, FC=00, and LAST=1, the data construction controller 1408 recognizes that an MPDU #1 includes an MSDU #1. At this time, the data construction controller 1406 recognizes that the MSDU #1 has the same length as an MPDU #1 data portion.

According to the fragmentation and packing information on the MSDUs received from the data construction controller 1408, the data restoration unit 1406 reconstructs an MPDU data portion, restoring an MSDU.

The data storage unit 1410 stores the MSDU restored in the data restoration unit 1406, and forwards the MSDU to an upper application program. For example, the data storage unit 1410 is constructed in a form of a data queue.

The transmitter 1412 includes a channel coding block, a modulating block, an RF processing block, etc. The transmitter 1412 converts an ARQ feedback message received from the controller 1404 into a high frequency signal and transmits the high frequency signal to the receive end through the duplexer 1400. For example, the channel coding block is comprised of a channel encoder, an interleaver, a modulator, etc. In an OFDM scheme, the modulating block is comprised of an IFFT operator. In a CDMA scheme, the modulating block is comprised of a code spreading modulator. The RF processing block converts a baseband signal received from the modulating block into a high frequency signal and outputs the high frequency signal through the antenna.

In the aforementioned construction, the controller 1404 can perform a function of the data construction controller 1408. These are separately constructed and shown merely to distinguish and describe respective functions. Thus, in an actual realization, construction can be such that all of them are processed in the controller 1404, and construction can be such that only part of them is processed in the controller 1404.

As described above, exemplary embodiments of the present invention generate an MPDU by an MSDU considering resource scheduling information of a MAC layer, and add MSDU information constituting one MPDU to the MPDU using one header or sub-header, thereby advantageously being capable of reducing a resource waste resulting from a size of an MPDU in a physical layer and increasing a data throughput in a wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting data of a Media Access Control (MAC) layer in a wireless communication system, the method comprising:

generating a MAC Protocol Data Unit (MPDU) data portion by reconstructing a MAC Service Data Unit (MSDU) for a connection;

generating a MPDU by adding a first header and a second header to the MPDU data portion; and transmitting the MPDU to a receive end, wherein the first header comprises a length of the MPDU and a connection identifier, and wherein the second header comprises a field representing a type of the second header and fragmentation information indicating whether a start byte of the MPDU data portion is the same as a start byte of the MSDU and whether a last byte of the MPDU data portion is the same as a last byte of the MSDU.

2. The method of claim 1, wherein the second header further comprises at least one of a field representing the existence of an additional Extended Header (EH), and a field representing the inclusion of Automatic Repeat reQuest (ARQ) feedback information.

3. The method of claim 1, wherein the second header further comprises sequence information on the MPDU, wherein the sequence information indicates a sequence number of the MPDU if an automatic repeat request (ARQ) is not applied to a connection for the MPDU, and wherein the sequence information indicates a sequence number of ARQ block included in the MPDU if the ARQ is applied to the connection for the MPDU.

4. The method of claim 1, wherein the generating of the MPDU comprises adding another MAC PDU data portion reconstructed from another MSDU for the connection, and wherein the second header further comprises a length of the other MSDU and information on the existence of additional control information.

5. The method of claim 1, wherein the length of the MPDU comprises one of a total length of the MPDU and a payload length of the MPDU.

6. The method of claim 1, wherein the generating of the MPDU comprises adding another MPDU data portion reconstructed from another MSDU for another connection, wherein the MPDU comprises a third header for the another MPDU data, and wherein the third header comprises a field representing a type of the third header and fragmentation information indicating whether a start byte of the another MPDU data portion is same to a start byte of the at least one another MSDU and whether a last byte of the another MPDU data portion is same to a last byte of the at least one another MSDU.

7. An apparatus for transmitting data of a Media Access Control (MAC) layer in a wireless communication system, the apparatus comprising:

a data constructor for generating a MAC Protocol Data Unit (MPDU) data portion by reconstructing a MAC Service Data Unit (MSDU) for a connection;

a controller for generating a MPDU by adding a first header and a second header to the MPDU data portion; and a transmitter for transmitting the MPDU to a receive end, wherein the first header comprises a length of the MPDU and a connection identifier, and wherein the second header comprises a field representing a type of the second header and fragmentation informa-
tion indicating whether a start byte of the MPDU data portion is same to a start byte of the MSDU and whether a last byte of the MPDU data portion is same to a last byte of the MSDU.

8. The apparatus of claim 7, wherein the second header further comprises at least one of a field representing the existence of an additional Extended Header (EH), and a field representing the inclusion of Automatic Repeat reQuest (ARQ) feedback information.

9. The apparatus of claim 7,
wherein the second header further comprises sequence information on the MPDU,
wherein the sequence information indicates a sequence number of the MPDU if an automatic repeat request (ARQ) is not applied to a connection for the MPDU, and
wherein the sequence information indicates a sequence number of ARQ block included in the MPDU if the ARQ is applied to the connection for the MPDU.

10. The apparatus of claim 7,
wherein the controller adds another MAC PDU data portion reconstructed from another MSDU for the connection, and
wherein the second header further comprises a length of the another MSDU and information on the existence of additional control information.

11. The apparatus of claim 7, wherein the length of the MPDU comprises one of a total length of the MPDU and a payload length of the MPDU.

12. The apparatus of claim 7,
wherein the controller adds another MPDU data portion reconstructed from another MSDU for another connection,
wherein the MPDU comprises a third header for the other MPDU data, and
wherein the third header comprises a field representing a type of the third header and fragmentation information indicating whether a start byte of the other MPDU data portion is same to a start byte of the at least one other MSDU and whether a last byte of the other MPDU data portion is the same as a last byte of the at least one another MSDU.

* * * * *